(12) United States Patent
Kimura et al.

(10) Patent No.: US 12,367,664 B2
(45) Date of Patent: Jul. 22, 2025

(54) COMPUTER-READABLE RECORDING MEDIUM STORING LABEL CHANGE PROGRAM, LABEL CHANGE METHOD, AND INFORMATION PROCESSING APPARATUS

(71) Applicant: Fujitsu Limited, Kawasaki (JP)

(72) Inventors: Yoshie Kimura, Kawasaki (JP); Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 17/959,156

(22) Filed: Oct. 3, 2022

(65) Prior Publication Data

US 2023/0169760 A1 Jun. 1, 2023

(30) Foreign Application Priority Data

Nov. 30, 2021 (JP) ................................ 2021-194402

(51) Int. Cl.
| | |
|---|---|
| *G06F 18/23* | (2023.01) |
| *G06V 10/25* | (2022.01) |
| *G06V 10/762* | (2022.01) |
| *G06V 10/764* | (2022.01) |
| *G06V 10/774* | (2022.01) |
| *G06V 10/82* | (2022.01) |
| *G06V 20/40* | (2022.01) |

(Continued)

(52) U.S. Cl.
CPC .......... *G06V 10/7747* (2022.01); *G06V 10/25* (2022.01); *G06V 10/763* (2022.01); *G06V 20/41* (2022.01); *G06V 40/20* (2022.01)

(58) Field of Classification Search
CPC .. G06V 10/7747; G06V 10/25; G06V 10/763; G06V 20/41; G06V 40/20; G06V 10/764; G06V 10/82; G06V 20/52; G06V 40/10; G06V 40/103; G06F 18/23
See application file for complete search history.

(56) References Cited

U.S. PATENT DOCUMENTS 10,068,335 B2 * 9/2018 Ikeda ........................ G06T 7/73
10,839,203 B1 * 11/2020 Guigues .................. G06T 7/292
(Continued)

FOREIGN PATENT DOCUMENTS

| JP | 2007-200298 | 8/2007 |
|---|---|---|
| JP | 2012-173903 A | 9/2012 |

(Continued)

OTHER PUBLICATIONS

JPOA—Office Action of Japanese Patent Application No. 2021-194402 dated Jun. 10, 2025 with Machine Translation.

*Primary Examiner* — John Villecco
*Assistant Examiner* — Kyla Guan-Ping Tiao Allen
(74) *Attorney, Agent, or Firm* — Fujitsu Intellectual Property Center

(57) ABSTRACT

A non-transitory computer-readable recording medium stores a label change program for causing a computer to execute a process including: acquiring image data that includes a plurality of areas; setting a label for each of the plurality of areas by inputting the image data to a first machine learning model; specifying a behavior performed by a person located in a first area among the plurality of areas for an object located in a second area; and changing a label set for the second area based on a specified behavior of the person.

7 Claims, 25 Drawing Sheets

(51) Int. Cl.
    *G06V 20/52*    (2022.01)
    *G06V 40/10*    (2022.01)
    *G06V 40/20*    (2022.01)

(56) References Cited

U.S. PATENT DOCUMENTS

| | | | |
|---|---|---|---|
| 2009/0273687 A1 | 11/2009 | Tsukizawa et al. | |
| 2013/0054377 A1 | 2/2013 | Krahnstoever et al. | |
| 2018/0300538 A1* | 10/2018 | Horie | G06V 20/52 |
| 2019/0215424 A1* | 7/2019 | Adato | G06T 7/521 |
| 2019/0258851 A1* | 8/2019 | Rajan | G06T 7/251 |
| 2020/0250736 A1* | 8/2020 | Howard | G06V 20/10 |
| 2022/0076128 A1* | 3/2022 | Liu | G06N 3/084 |
| 2022/0270363 A1 | 8/2022 | Gotoh et al. | |

FOREIGN PATENT DOCUMENTS

| | | |
|---|---|---|
| JP | 2013-050945 A | 3/2013 |
| JP | 2021-514512 | 6/2021 |
| WO | 2019/164986 A1 | 8/2019 |
| WO | 2021/029164 A1 | 2/2021 |

* cited by examiner

COMPUTER-READABLE RECORDING MEDIUM STORING LABEL CHANGE PROGRAM, LABEL CHANGE METHOD, AND INFORMATION PROCESSING APPARATUS

CROSS-REFERENCE TO RELATED APPLICATION

This application is based upon and claims the benefit of priority of the prior Japanese Patent Application No. 2021-194402, filed on Nov. 30, 2021, the entire contents of which are incorporated herein by reference.

FIELD

The embodiments discussed herein are related to a computer-readable recording medium storing a label change program, a label change method, and an information processing apparatus.

BACKGROUND

A technique for analyzing a person's behavior from video data obtained by imaging with a camera has been developed. For example, a buying behavior is analyzed by extracting a region of interest, which is a region in which a buying behavior is likely to occur, from each piece of image data included in video data, and detecting, as a picking motion, a motion of lifting an arm to a certain position in the region of interest. In recent years, as a method of detecting a region of interest, manual setting of a region of interest or setting of a region of interest using semantic segmentation is used for each piece of image data.

Japanese Laid-open Patent Publication No. 2012-173903 and Japanese Laid-open Patent Publication No. 2013-50945 are disclosed as related art.

SUMMARY

According to an aspect of the embodiments, a non-transitory computer-readable recording medium stores a label change program for causing a computer to execute a process including: acquiring image data that includes a plurality of areas; setting a label for each of the plurality of areas by inputting the image data to a first machine learning model; specifying a behavior performed by a person located in a first area among the plurality of areas for an object located in a second area; and changing a label set for the second area based on a specified behavior of the person.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, with the above technique, it is difficult to accurately set a region of interest. For example, a manual method takes time and it is difficult to suppress human errors since a region of interest has to be set for a large amount of image data. In a method using semantic segmentation, the entire aisle region where consumers walk in a store is set as a region of interest. For this reason, an unwanted picking motion is detected, and the accuracy of behavior analysis is deteriorated.

According to one aspect, an object is to provide a label change program, a label change method, and an information processing apparatus capable of suppressing deterioration in the accuracy of behavior analysis.

Hereinafter, the embodiments of a label change program, a label change method, and an information processing apparatus disclosed herein will be described in detail based on the drawings. This disclosure is not limited by the embodiments. The embodiments may be combined with each other as appropriate within the scope without contradiction.

Embodiment 1

Overall Configuration

Figure 1:
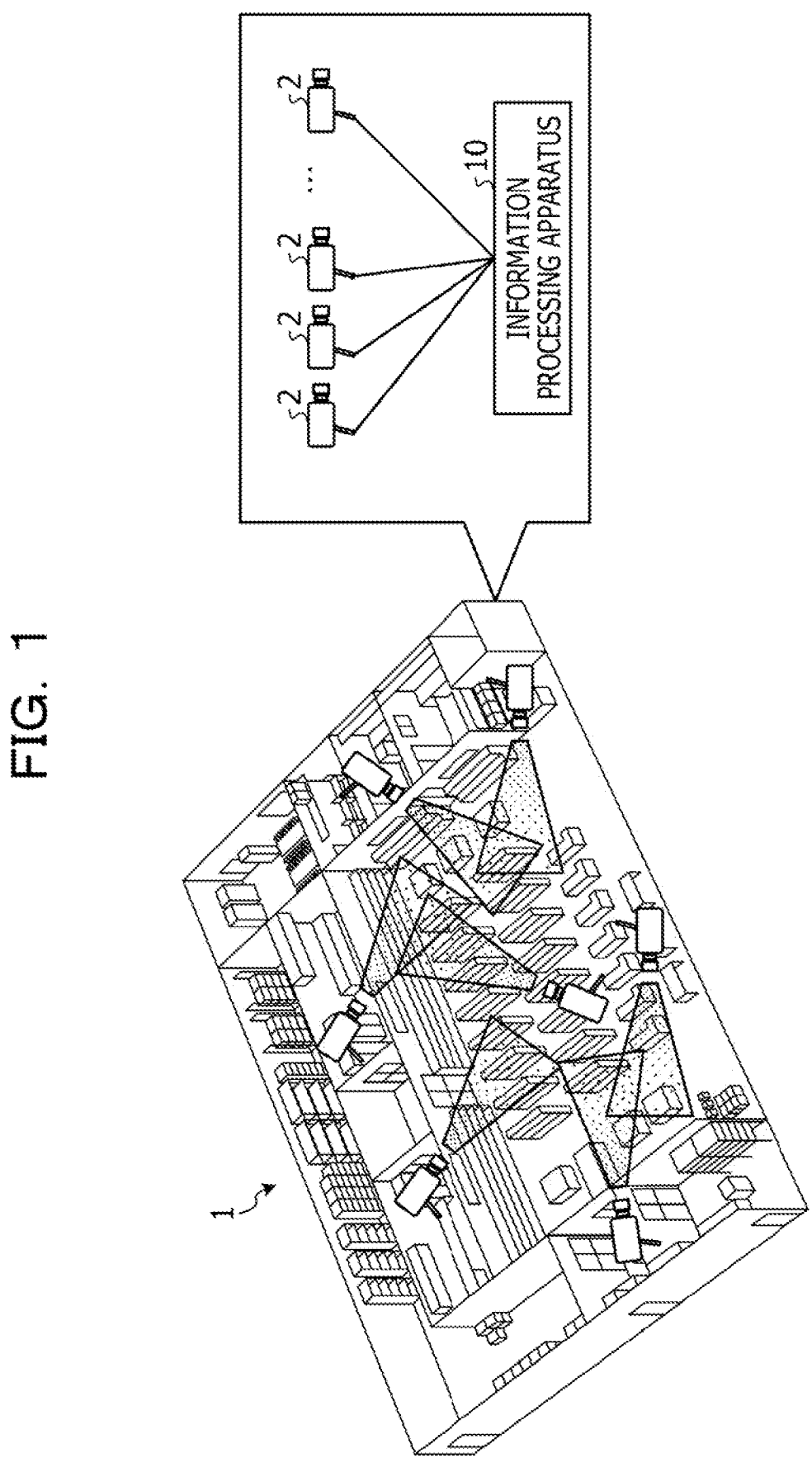
FIG. 1 is a diagram describing an overall configuration of a system including an information processing apparatus according to Embodiment 1.

FIG. 1 is a diagram describing an overall configuration of a system including an information processing apparatus 10 according to Embodiment 1. As illustrated in FIG. 1, this system includes a store 1 that is an example of a space, a plurality of cameras 2 installed at different locations in the store 1, and the information processing apparatus 10.

Each of the plurality of cameras 2 is an example of a monitoring camera that images a predetermined region in the store 1, and transmits imaged data of video to the information processing apparatus 10. In the following description, data of video may be referred to as "video data". A plurality of time-series image frames are included in video data. A frame number is assigned to each image frame in ascending order of time series. One image frame is image data of a still image taken by the camera 2 at a certain timing.

The information processing apparatus 10 is an example of a computer that analyzes each piece of image data obtained by imaging with each of the plurality of cameras 2. Each of the plurality of cameras 2 and the information processing apparatus 10 are coupled to each other by using various networks such as the Internet and a dedicated line regardless of wired or wireless.

A technique for analyzing a person's behavior from video data imaged by the camera 2 has been developed in recent years. For example, a buying behavior has been analyzed by extracting a region of interest, which is a region in which a buying behavior is likely to occur, from each piece of image data included in video data, and detecting, as a picking motion, a motion of lifting an arm to a certain position in the region of interest.

Figure 2:
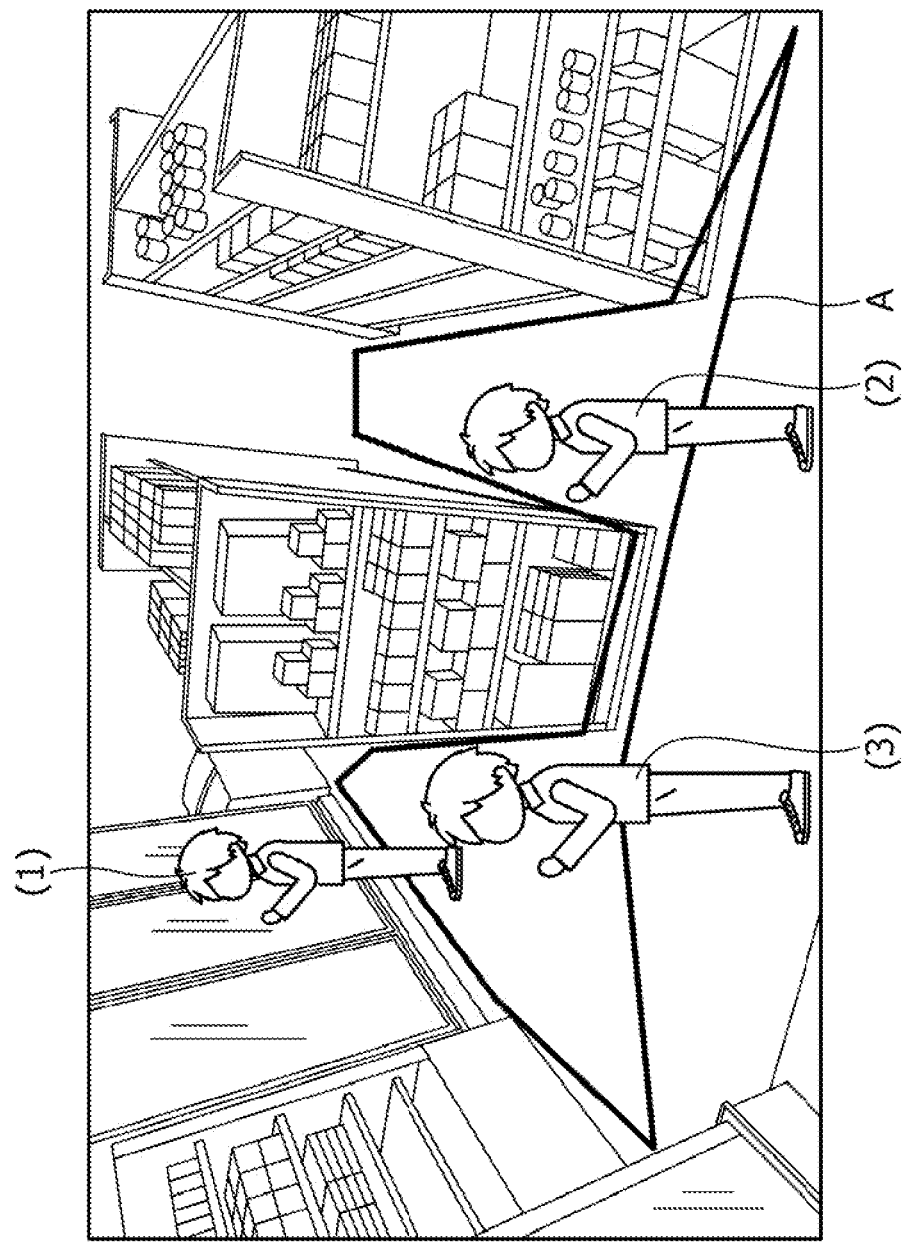
FIG. 2 is a diagram describing a behavior of a recognition target according to Embodiment 1.

FIG. 2 is a diagram describing a behavior of a recognition target according to Embodiment 1. A region A illustrated in FIG. 2 is assumed to be a region of interest. In this case, a picking motion of a person (user) located in front of a store shelf, indicated by (1) in FIG. 2, is a recognition target. However, erroneous detection occurs by recognition of persons indicated by (2) and (3) in FIG. 2, who have not reached for an item but have performed a motion similar to a picking motion at a place where there is no store shelf.

Although it is conceivable to set a region of a store shelf to reach for as a region of interest in order to reduce erroneous detection, in such case, the person indicated by (2) in FIG. 2 is erroneously detected because the hand is put in a shelf in the image data. As another method, an aisle is set as a region of interest. For example, in a case where the region A illustrated in FIG. 2 is set as a region of interest, the persons indicated by (2) and (3) in FIG. 2 are not detected, and erroneous detection is suppressed.

A method of setting a floor region as a region of interest is often performed by manual setting. However, manual setting takes time and it is difficult to suppress human errors since a region of interest has to be set for a large amount of image data.

Figure 3:
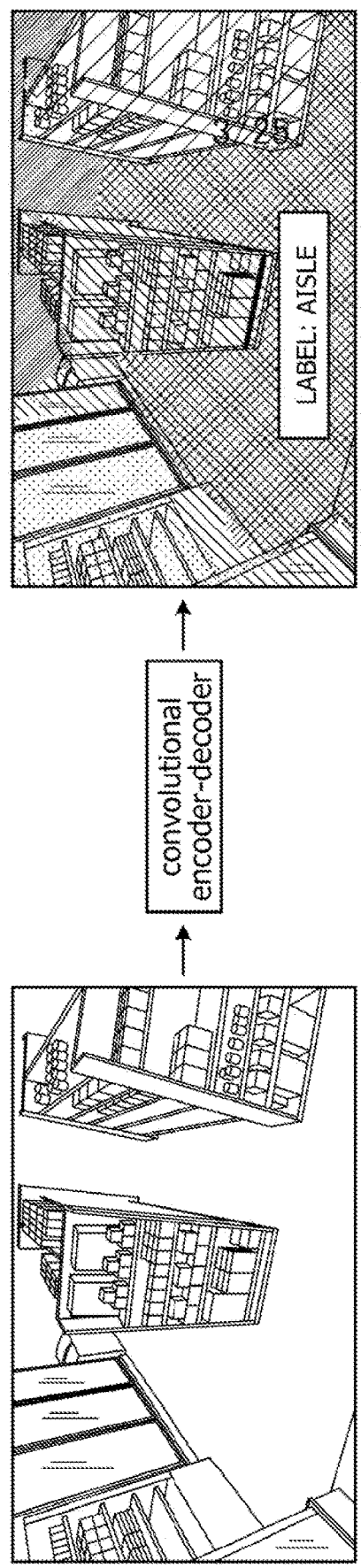
FIG. 3 is a diagram describing detection of a region of interest by semantic segmentation.

As another method, automatic setting by semantic segmentation, which is a technique for categorizing what is imaged in units of pixels of image data, is used. FIG. 3 is a diagram describing detection of a region of interest by semantic segmentation. As illustrated in FIG. 3, in semantic segmentation, image data is input to a machine learning model (convolutional encoder-decoder), and an output result in which a label is set for each region of the image data is acquired. However, since the label "aisle" is set not only for the region of interest but also for all aisles including regions other than the region of interest, and motions of the persons indicated by (2) and (3) in FIG. 2 are also recognition targets, erroneous detection occurs in which the picking motions of these persons are detected.

Figure 4:
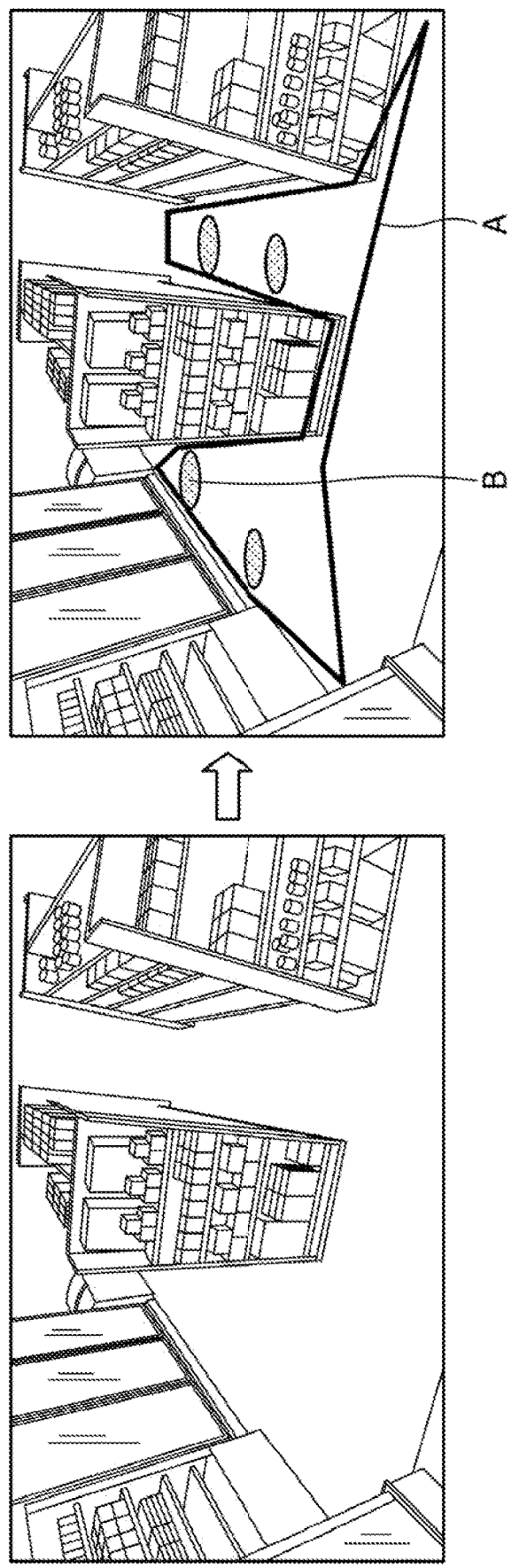
FIG. 4 is a diagram describing detection of a region of interest in a reference technique.

It is also conceivable to use a reference technique in which work positions of persons are extracted from video data of a camera, and a region of interest (ROI) is automatically provided by clustering of the work positions. FIG. 4 is a diagram describing detection of a region of interest in the reference technique. As illustrated in FIG. 4, in the reference technique, since a region in which the stationary buying behavior occurs is extracted, only the position indicated by (B) in FIG. 4 where a person is stationary is extracted, and it is difficult to sufficiently cover the region of interest A. For example, in the reference technique, it is difficult to detect a motion (picking motion) of picking up an item while moving slowly.

In many cases, behavior analysis or the like of a person is performed after setting, in image data, a store shelf area in which items and the like to be picked up by a person are displayed, as a region to be set as a region of interest or a region in which a picking motion is detected. However, as described above, it is difficult to accurately extract a region of interest by manual setting, semantic segmentation, or setting of a region of interest by the reference technique. For this reason, a setting error of a store shelf area occurs, and the accuracy of the final behavior analysis is deteriorated.

Accordingly, the information processing apparatus 10 according to Embodiment 1 acquires image data including a plurality of areas, executes semantic segmentation by inputting the image data to a machine learning model, and sets a label for each of the plurality of areas. The information processing apparatus 10 specifies a behavior performed by a person located in any first area among a plurality of areas for an object located in a second area, and changes a label set for the second area based on the specified behavior of the person.

For example, the information processing apparatus 10 extracts a region of interest in which selection and picking up of an item occurs by using the fact that movement and the behavior of selecting and picking up an item mainly occur as buying behaviors in a retail store and variation in the body direction with respect to the aisle direction occurs in selecting and picking up an item, and corrects a segmentation result. As a result, the information processing apparatus 10 may accurately set a region of interest to be the target of behavior analysis.

Functional Configuration

Figure 5:
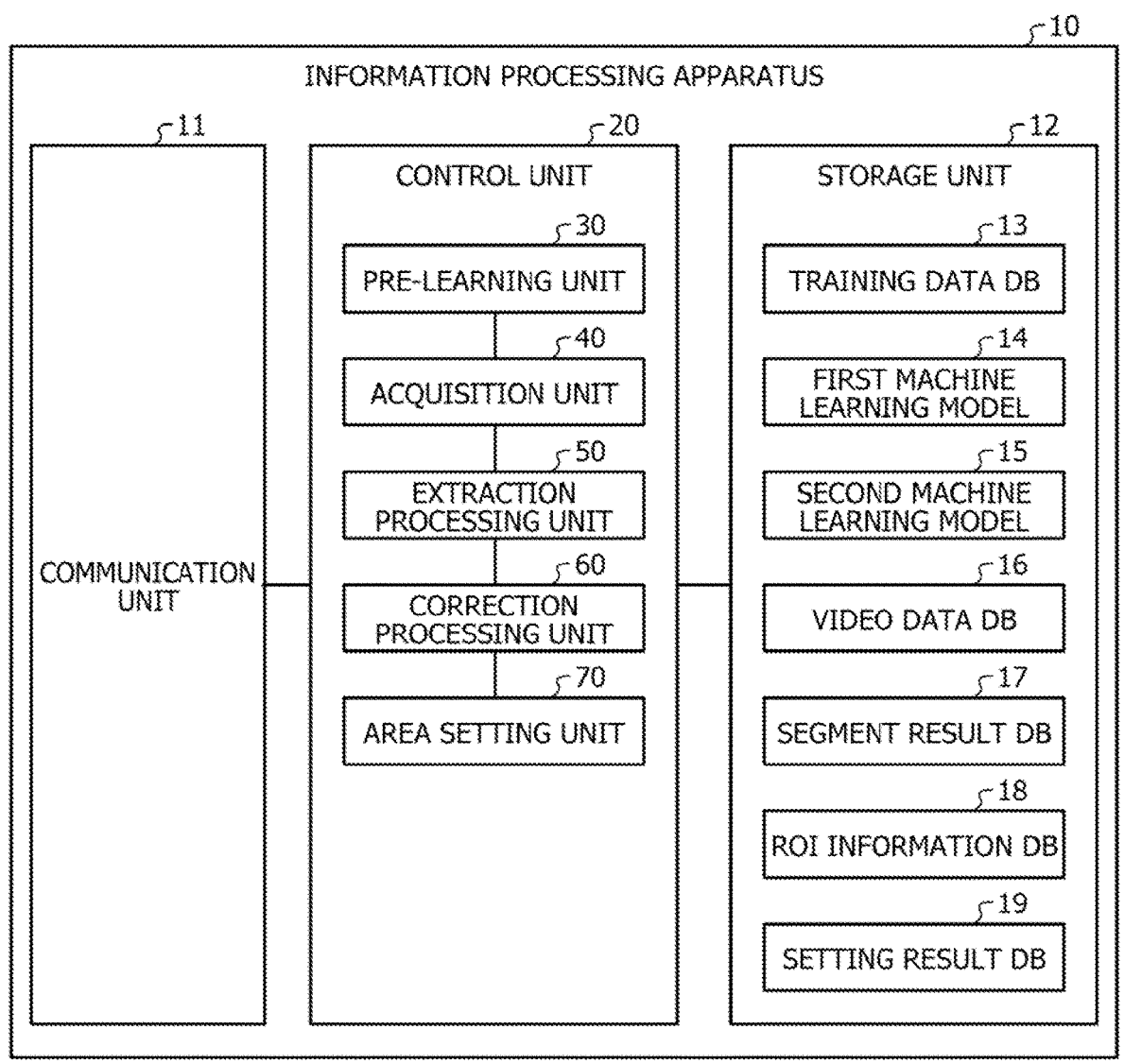
FIG. 5 is a functional block diagram illustrating a functional configuration of the information processing apparatus according to Embodiment 1.

FIG. 5 is a functional block diagram illustrating a functional configuration of the information processing apparatus 10 according to Embodiment 1. As illustrated in FIG. 5, the information processing apparatus 10 includes a communication unit 11, a storage unit 12, and a control unit 20.

The communication unit 11 is a processing unit that controls communication with other apparatuses, and is realized by, for example, a communication interface or the like. For example, the communication unit 11 receives video data from the camera 2, and transmits a result of processing by the control unit 20 to a management terminal or the like.

The storage unit 12 is a processing unit that stores various data, a program executed by the control unit 20, and the like, and is realized by a memory, a hard disk, or the like. The storage unit 12 stores a training data database (DB) 13, a first machine learning model 14, a second machine learning model 15, a video data DB 16, a segment result DB 17, an ROI information DB 18, and a setting result DB 19.

The training data DB 13 is a database that stores each piece of training data used for training of the first machine learning model 14. For example, each piece of training data is data in which RGB image data as an explanatory variable and a result of executing semantic segmentation on the image data (hereinafter, may be referred to as a segment result or a segmentation result) as an objective variable (correct answer information) are associated with each other.

The first machine learning model 14 is a model that executes semantic segmentation. For example, the first machine learning model 14 outputs a segmentation result in response to input of RGB image data. In the segmentation result, an identified label is set for each region in the image data. For example, convolutional encoder-decoder or the like may be adopted as the first machine learning model 14.

The second machine learning model 15 is a model that executes motion analysis. For example, the second machine learning model 15 is a machine-learned model, and is an example of a deep learning device that estimates two dimensional joint positions (skeleton coordinates) of a head, a wrist, a waist, an ankle, and the like with respect to two dimensional image data of a person, and performs recognition of a basic motion or recognition of a rule defined by a user. By using the second machine learning model 15, the basic motion of a person may be recognized, and the ankle position, face direction, and body direction may be acquired.

The video data DB 16 is a database that stores video data obtained by imaging with each of the plurality of cameras 2 installed in the store 1. For example, the video data DB 16 stores video data for each camera 2 or for each time slot of imaging.

The segment result DB 17 is a database that stores an execution result of semantic segmentation. For example, the segment result DB 17 stores an output result of the first machine learning model 14. For example, the segment result DB 17 stores RGB image data and an execution result of semantic segmentation in association with each other.

The ROI information DB 18 is a database that stores an ROI of a region of interest, an ROI of a store shelf, and the like obtained by the control unit 20 described later. For example, the ROI information DB 18 stores an ROI of a region of interest, an ROI of a store shelf, and the like in association with each other for each piece of RGB image data.

The setting result DB 19 is a database that stores a result of setting an area of a store shelf for a segment result by the control unit 20 described later. For example, the setting result DB 19 stores RGB image data and setting information of each label set for the image data in association with each other.

The control unit 20 is a processing unit that manages the entire information processing apparatus 10, and is realized by, for example, a processor or the like. The control unit 20 includes a pre-learning unit 30, an acquisition unit 40, an extraction processing unit 50, a correction processing unit 60, and an area setting unit 70. The pre-learning unit 30, the acquisition unit 40, the extraction processing unit 50, the correction processing unit 60, and the area setting unit 70 are realized by an electronic circuit included in the processor, a process executed by the processor, or the like.

The pre-learning unit 30 is a processing unit that generates the first machine learning model 14. For example, the pre-learning unit 30 executes training of the first machine learning model 14 by machine learning using each piece of training data stored in the training data DB 13.

Figure 6:
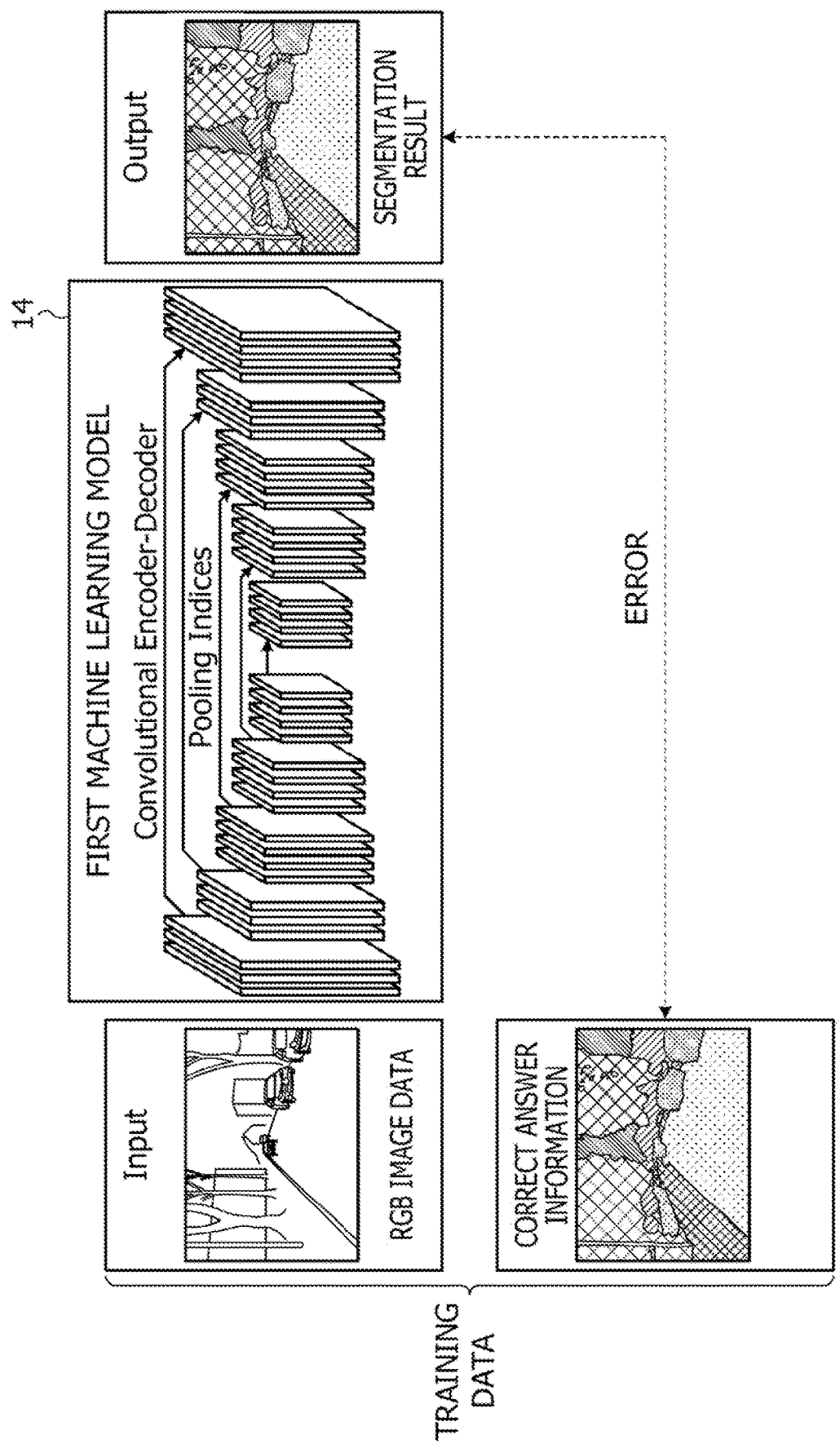
FIG. 6 is a diagram describing generation of a first machine learning model.

FIG. 6 is a diagram describing generation of the first machine learning model 14. As illustrated in FIG. 6, the pre-learning unit 30 inputs training data including RGB image data and correct answer information (segmentation result) to the first machine learning model 14, and acquires an output result (segmentation result). The pre-learning unit 30 optimizes parameters and the like of the first machine learning model 14 such that an error between the correct answer information of the training data and the output result is minimized.

The acquisition unit 40 is a processing unit that acquires video data from each camera 2 and stores the video data in the video data DB 16. For example, the acquisition unit 40 may acquire video data at any time or periodically from each camera 2.

Figure 7:
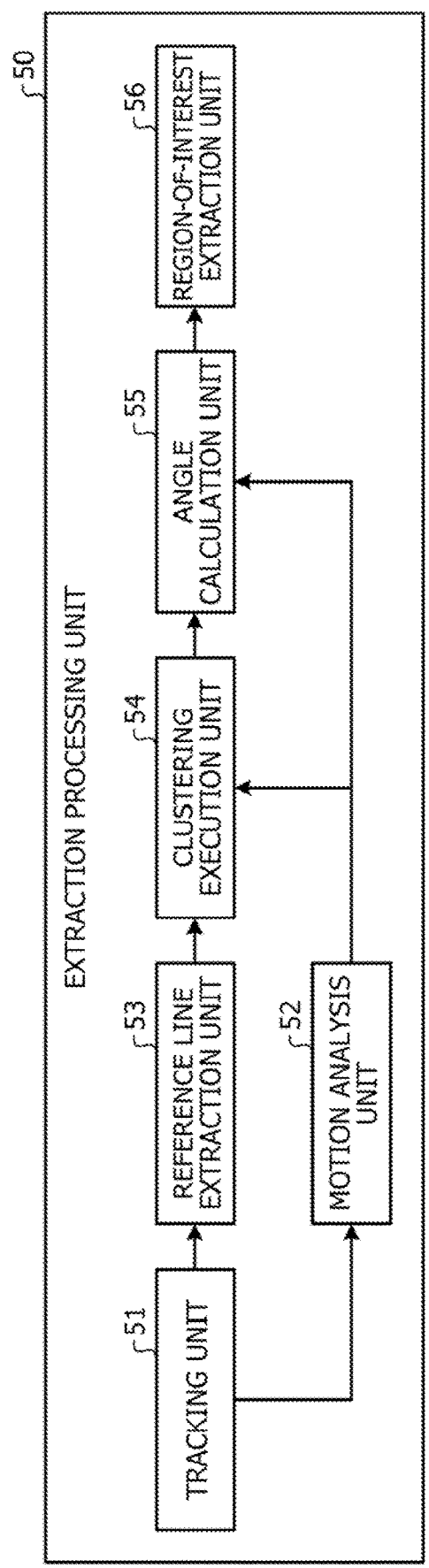
FIG. 7 is a diagram describing an extraction processing unit according to Embodiment 1.

The extraction processing unit 50 is a processing unit that extracts a region of interest in video data by motion analysis on the video data. FIG. 7 is a diagram describing the extraction processing unit 50 according to Embodiment 1. As illustrated in FIG. 7, the extraction processing unit 50 includes a tracking unit 51, a motion analysis unit 52, a reference line extraction unit 53, a clustering execution unit 54, an angle calculation unit 55, and a region-of-interest extraction unit 56.

The tracking unit 51 is a processing unit that executes tracking of the same person in video data. For example, the tracking unit 51 tracks the same person in video data using a known tracking technique, and extracts a movement route (movement trajectory) of the person. The tracking unit 51 outputs an extraction result to the reference line extraction unit 53 and the like.

The motion analysis unit 52 is a processing unit that executes motion analysis of a person appearing in video data obtained by imaging with the camera 2. For example, the motion analysis unit 52 inputs each piece of image data (frame) included in video data to the second machine learning model 15, and recognizes a motion of a person appearing in each piece of image data.

Figure 8:
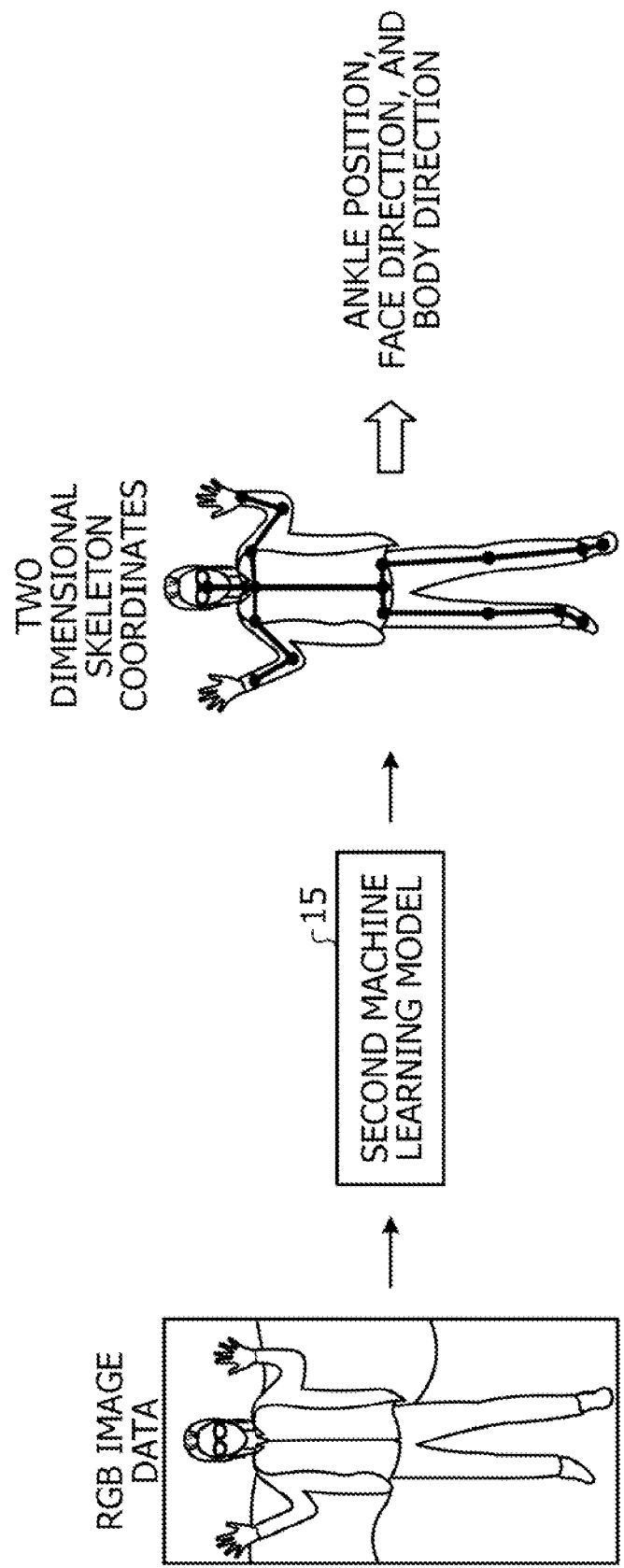
FIG. 8 is a diagram describing motion analysis using a second machine learning model.

FIG. 8 is a diagram describing motion analysis using the second machine learning model 15. As illustrated in FIG. 8, the motion analysis unit 52 inputs RGB image data to the second machine learning model 15, and acquires the two dimensional skeleton coordinates of a person appearing in the image data. The motion analysis unit 52 specifies the ankle position, face direction, and body direction of the person according to the two dimensional skeleton coordinates, and outputs a specification result to the clustering execution unit 54 and the like.

As described above, the motion analysis unit 52 may specify the transition of the ankle position, the transition of the face direction, and the transition of the body direction of a person appearing in video data by inputting each piece of image data included in each piece of video data acquired at predetermined time intervals (for example, 100 frames) to the second machine learning model 15, and measuring the ankle position, face direction, and body direction of the person appearing in each piece of image data.

The reference line extraction unit 53 is a processing unit that extracts a movement route of a person from tracking information and sets an aisle direction serving as a reference line. For example, the reference line extraction unit 53 acquires (selects) image data from video data, and sets a reference direction, which is a direction in which a user walks, in the acquired image data using the movement route of a certain person obtained by the tracking unit 51. The reference line extraction unit 53 extracts the set reference direction as a reference line indicating a movement route.

The reference line extraction unit 53 may select, as image data, arbitrary image data in video data such as the first image data or the last image data of the video data.

Figure 9:
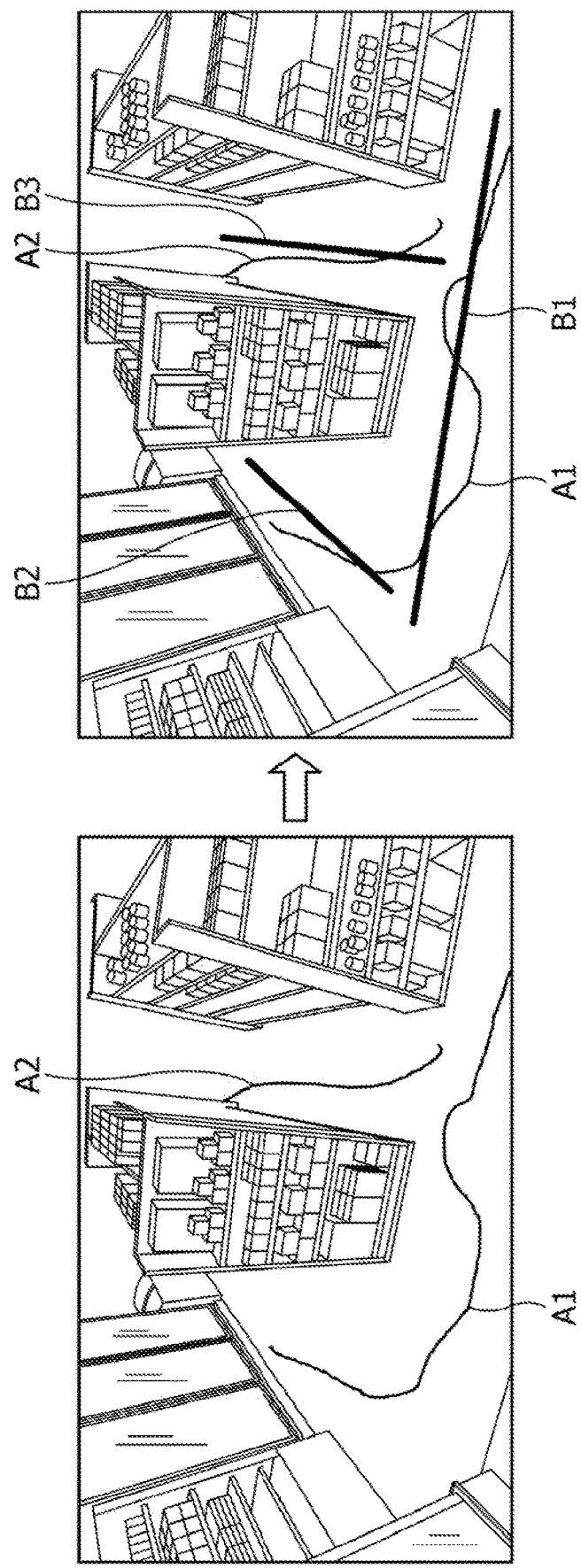
FIG. 9 is a diagram describing setting of reference directions by tracking.

FIG. 9 is a diagram describing setting of reference directions by tracking. As illustrated in FIG. 9, the reference line extraction unit 53 sets a movement route A1 and a movement route A2, which are tracking results, in image data. At this time, the reference line extraction unit 53 may set a region including the set movement route as an aisle region. The reference line extraction unit 53 may set an aisle region in image data according to a result of executing semantic segmentation on the image data.

Subsequently, the reference line extraction unit 53 specifies the transition from the movement route A1 to the movement route A2 based on the tracking results, and sets each of reference directions B1, B2, and B3 in the aisle region based on the transition. The reference line extraction unit 53 sets each of the reference directions B1, B2, and B3 as a reference line. While a movement route or transition of movement route is not limited to one direction and may be specified in multiple directions, even in such case, the movement route or transition of movement route is in one aisle direction and is extracted as one reference line as long as the movement trajectories are the same except for the directions. For example, the reference line extraction unit 53 calculates an approximate straight line serving as an aisle direction from a plurality of movement routes on which a user walks, and sets an approximate curve thereof as a reference line. The reference line extraction unit 53 outputs a setting result of reference lines to the clustering execution unit 54 and the like.

The clustering execution unit 54 is a processing unit that extracts a movement trajectory of each person and generates a plurality of clusters by clustering based on the distance between each reference line and the movement trajectory of each person. For example, the clustering execution unit 54 performs clustering of which reference line each movement trajectory is close to.

Figure 10:
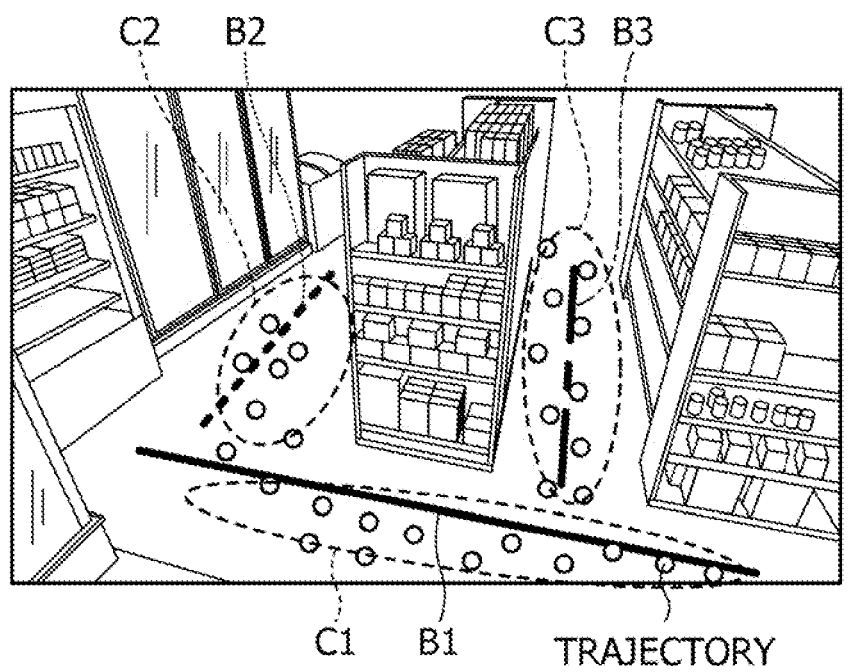
FIG. 10 is a diagram describing clustering.

FIG. 10 is a diagram describing clustering. As illustrated in FIG. 10, the clustering execution unit 54 acquires the ankle positions of persons appearing in each piece of image data from the motion analysis unit 52, and plots the positions on the image data in which the reference lines B1, B2, and B3 are set. The clustering execution unit 54 generates a plurality of clusters by clustering based on the distance between each reference line and the movement trajectory of each person.

For example, the clustering execution unit 54 performs clustering of each movement trajectory to any one of the reference lines by drawing a perpendicular line from each movement trajectory to each reference line and executing clustering based on the length of the perpendicular line. A distance serving as a base is not limited to the length of a perpendicular line, and a Euclidean distance or the like may be used.

As a result, the clustering execution unit 54 generates a cluster C1 including the point cloud of the movement trajectory closest to the reference line B1, a cluster C2 including the point cloud of the movement trajectory closest to the reference line B2, and a cluster C3 including the point cloud of the movement trajectory closest to the reference line B3. The clustering execution unit 54 outputs a clustering result to the angle calculation unit 55 and the like.

The angle calculation unit 55 is a processing unit that calculates an angle formed by the body direction with respect to each reference line for each movement trajectory for which clustering has been executed. For example, the angle calculation unit 55 acquires the body direction of a person appearing in each piece of image data from the motion analysis unit 52, and associates the corresponding body direction with a movement trajectory in the image data. The angle calculation unit 55 specifies the reference line of the cluster to which each movement trajectory belongs by using the clustering result. After that, the angle calculation unit 55 calculates, for each movement trajectory, an angle formed by the reference line of the cluster to which the movement trajectory belongs and the body direction by using a known method. The angle calculation unit 55 may use not only the body direction but also the face direction. The angle calculation unit 55 outputs an angle corresponding to each movement trajectory to the region-of-interest extraction unit 56 and the like.

The region-of-interest extraction unit 56 is a processing unit that extracts, as a region of interest, a region including a cluster for which an evaluation value based on an angle formed by each movement trajectory belonging to the cluster and a reference line is equal to or larger than a threshold, for each of the plurality of clusters. For example, the region-of-interest extraction unit 56 extracts a reference line including many large angles among angles formed by the body direction with respect to each reference line, and extracts a region to which such reference line belongs as a region of interest.

Figure 11:
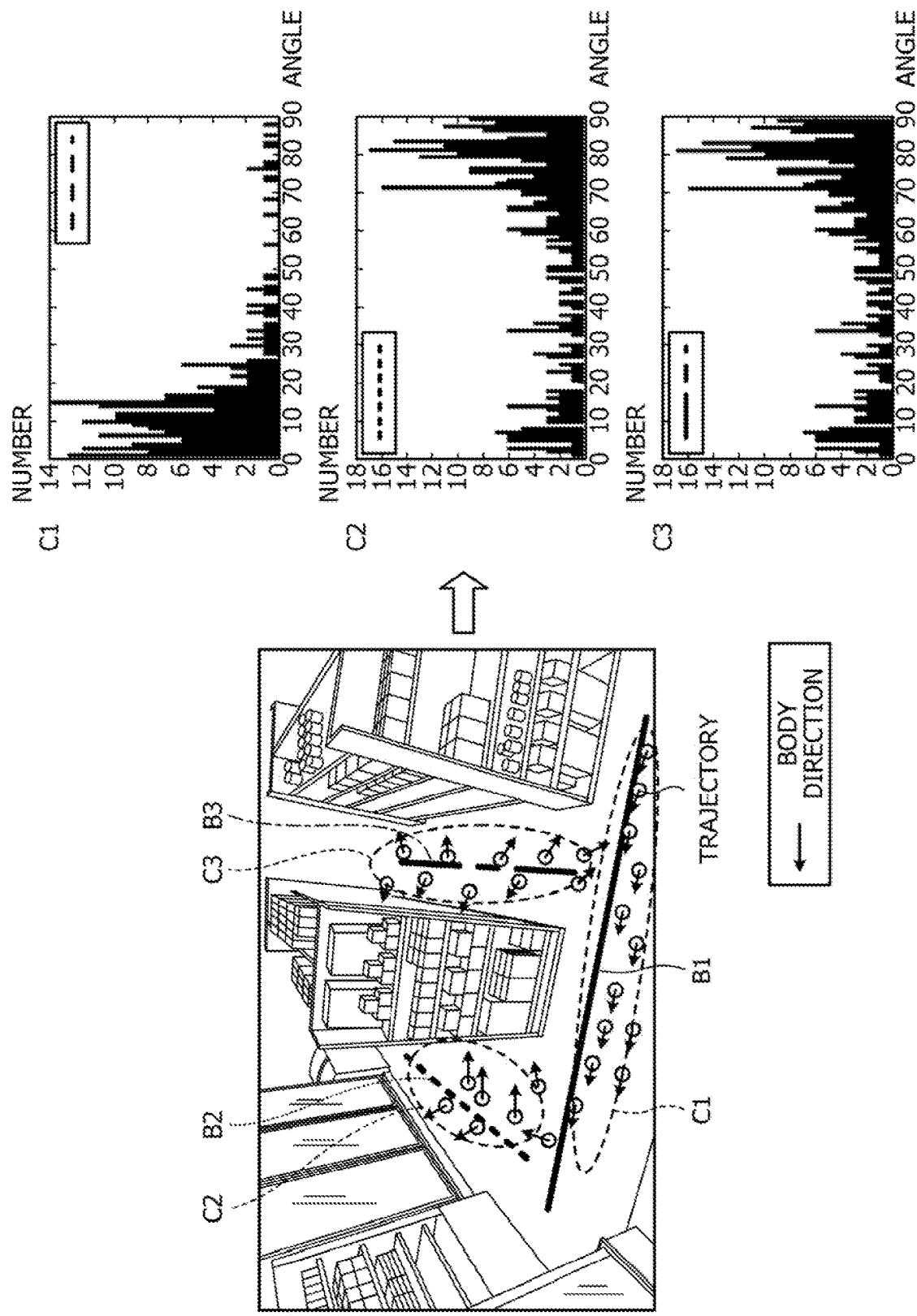
FIG. 11 is a diagram describing extraction of clusters.

FIG. 11 is a diagram describing extraction of clusters. As illustrated in FIG. 11, the region-of-interest extraction unit 56 plots the body direction corresponding to each movement trajectory on the image data on which each movement trajectory is plotted. The region-of-interest extraction unit 56 also associates the calculated angle with each movement trajectory.

The region-of-interest extraction unit 56 aggregates, for each cluster, the angles of the movement trajectories belonging to the cluster. For example, as illustrated in FIG. 11, the region-of-interest extraction unit 56 aggregates the angles of the movement trajectories belonging to the cluster C1 and the number of movement trajectories corresponding to each angle, the angles of the movement trajectories belonging to the cluster C2 and the number of movement trajectories corresponding to each angle, and the angles of the movement trajectories belonging to the cluster C3 and the number of movement trajectories corresponding to each angle.

After that, the region-of-interest extraction unit 56 extracts a cluster including many large angles. For example, the region-of-interest extraction unit 56 calculates, for each cluster, a median value of angles, an average value of angles, a ratio of the number of angles equal to or greater than 60 degrees, and the like as evaluation values. The region-of-interest extraction unit 56 extracts the cluster C2 and the cluster C3 of which the evaluation value is equal to or larger than a threshold.

Figure 12:
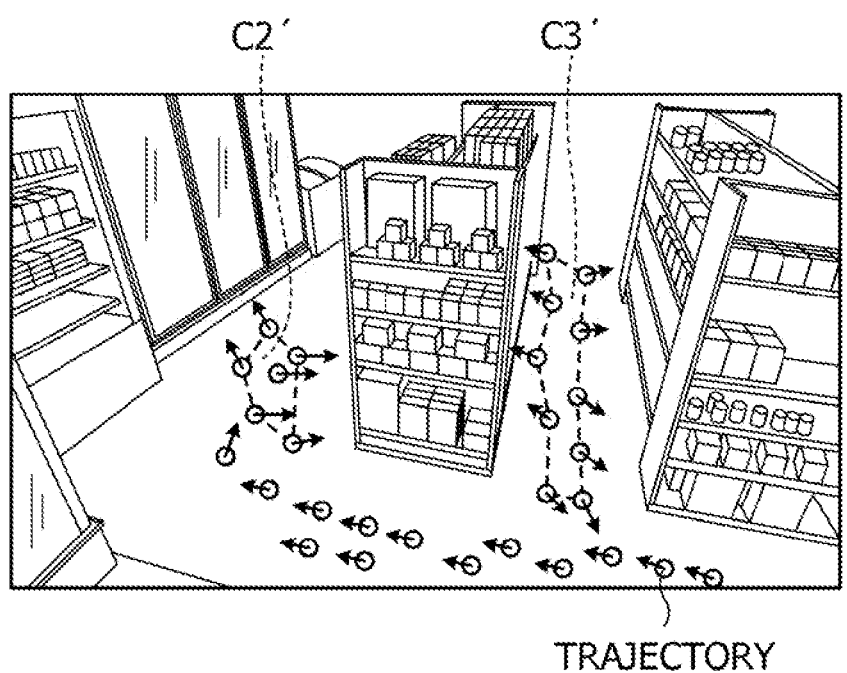
FIG. 12 is a diagram describing extraction of a region of interest.

Subsequently, the region-of-interest extraction unit 56 generates, for the extracted cluster C2 and cluster C3, a polygon surrounding the movement trajectories belonging to each cluster as a region of interest. FIG. 12 is a diagram describing extraction of a region of interest. As illustrated in FIG. 12, the region-of-interest extraction unit 56 generates, for the cluster C2, a maximum polygon C2' including the movement trajectories belonging to the cluster C2, and extracts the polygon as a region of interest. Similarly, the region-of-interest extraction unit 56 generates, for the cluster C3, a maximum polygon C3' including the movement trajectories belonging to the cluster C3, and extracts the polygon as a region of interest.

The region-of-interest extraction unit 56 stores the coordinates of each polygon in the ROI information DB 18 or outputs the coordinates to an area setting unit 70. For example, the region-of-interest extraction unit 56 stores, as information on the set region of interest, the image data in which the region of interest is set and the like in the setting result DB 19.

Figure 13:
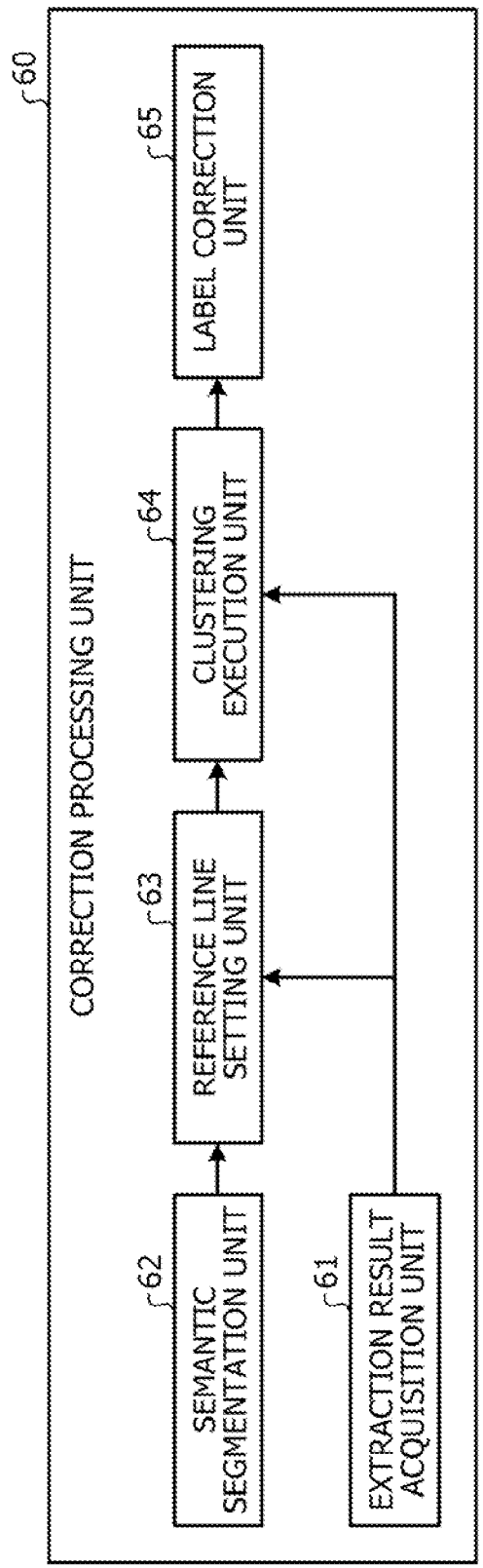
FIG. 13 is a diagram describing a correction processing unit according to Embodiment 1.

Returning to FIG. 5, the correction processing unit 60 is a processing unit that uses an extraction result of the extraction processing unit 50 and corrects (changes) the label of each area obtained by semantic segmentation. FIG. 13 is a diagram describing the correction processing unit 60 according to Embodiment 1. As illustrated in FIG. 13, the correction processing unit 60 includes an extraction result acquisition unit 61, a semantic segmentation unit 62, a reference line setting unit 63, a clustering execution unit 64, and a label correction unit 65.

The extraction result acquisition unit 61 is a processing unit that acquires a processing result of the extraction processing unit 50. For example, the extraction result acquisition unit 61 acquires, from the correction processing unit 60, information on a reference line, an extraction result of a region of interest, information on an ROI, a behavior recognition result such as the ankle position, body direction, and face direction, and the like, and outputs such information and results to the reference line setting unit 63, the clustering execution unit 64, and the like.

The semantic segmentation unit 62 is a processing unit that assigns a label to each area of image data by semantic segmentation. For example, the semantic segmentation unit 62 inputs, to the first machine learning model 14, image data included in video data such as image data used by the extraction processing unit 50 for extracting a region of interest. The semantic segmentation unit 62 acquires an execution result of semantic segmentation executed by the first machine learning model 14.

The semantic segmentation unit 62 outputs the execution result of semantic segmentation (segmentation result) to the reference line setting unit 63. In the segmentation result, a label indicating an identified result is assigned to each of a plurality of regions included in the image data. For example, labels such as "shelf", "aisle", and "wall" are assigned to the execution result of semantic segmentation.

Figure 14:
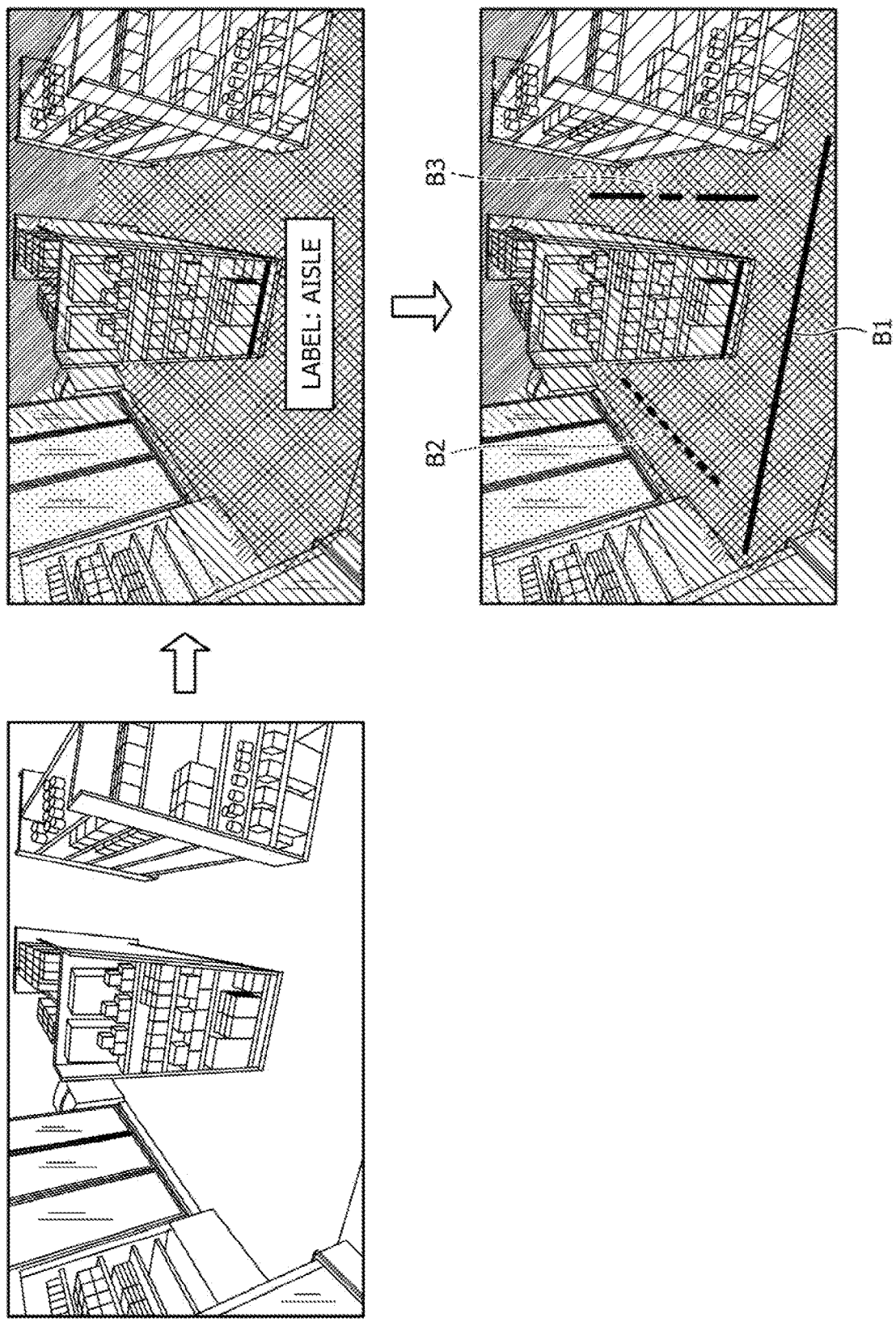
FIG. 14 is a diagram describing setting of reference lines for an execution result of semantic segmentation.

The reference line setting unit 63 is a processing unit that sets reference lines in a segmentation result. FIG. 14 is a diagram describing setting of reference lines for an execution result of semantic segmentation. As illustrated in FIG. 14, the reference line setting unit 63 acquires a segmentation result from the semantic segmentation unit 62, and acquires information on a reference line from the extraction result acquisition unit 61. The reference line setting unit 63 plots the reference lines B1, B2, and B3 on the segmentation result.

Figure 15:
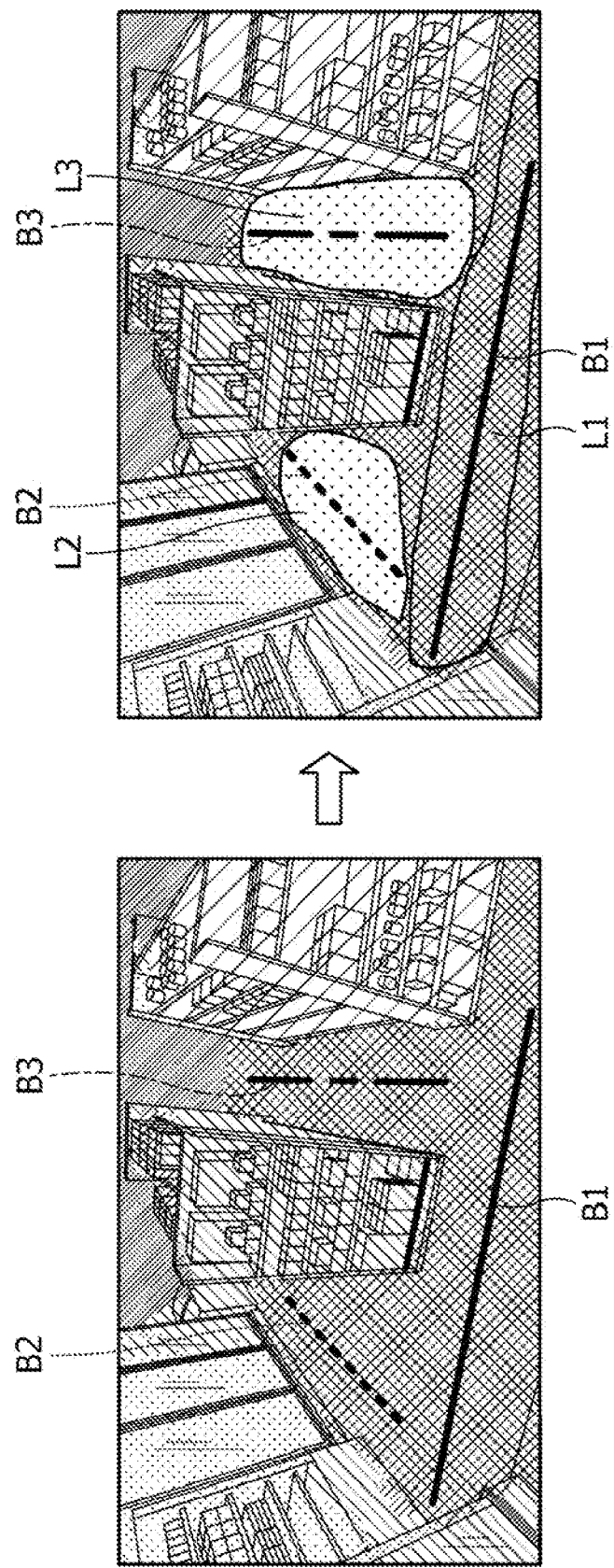
FIG. 15 is a diagram describing clustering based on reference lines.

The clustering execution unit 64 is a processing unit that executes clustering based on a reference line for a segmentation result in which reference lines are set by the reference line setting unit 63. FIG. 15 is a diagram describing clustering based on reference lines. As illustrated in FIG. 15, the clustering execution unit 64 specifies an area in which the label of "aisle" is set among the labels set (identified) in a segmentation result. The clustering execution unit 64 calculates the distance between each pixel belonging to the specified area of "aisle" and each reference line (B1, B2, B3), and performs clustering of each pixel so that each pixel belongs to the closet reference line. The length of a perpendicular line from each pixel to each reference line, a Euclidean distance between a pixel and a reference line, or the like may be used as a distance.

The clustering execution unit 64 specifies a cluster L1 belonging to the reference line B1, a cluster L2 belonging to the reference line B2, and a cluster L3 belonging to the reference line B3. After that, the clustering execution unit 64 outputs the specification result and the like to the label correction unit 65 and the like.

The label correction unit 65 is a processing unit that corrects a label of a segmentation result based on an extraction result of the extraction processing unit 50. For example, the label correction unit 65 specifies a cluster of interest corresponding to a region of interest among a plurality of clusters, corrects the region of the cluster of interest to a region including the corresponding region of interest, and changes a label set for the corrected region to a label corresponding to the region of interest. For example, the label correction unit 65 corrects the region of each cluster such that the region including a clustering result generated by the clustering execution unit 64 and a region of interest extracted by the extraction processing unit 50 is the maximum, and labels the corrected region as a region of interest.

Figure 16:
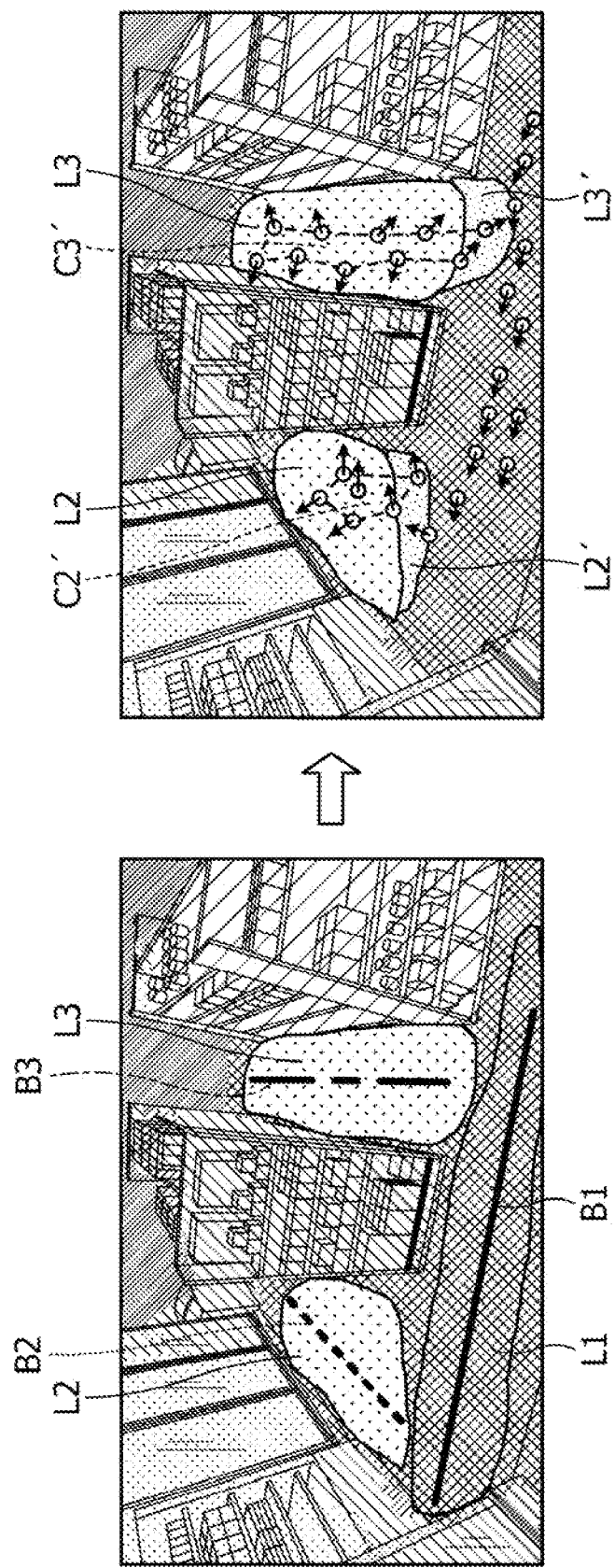
FIG. 16 is a diagram describing label correction.

FIG. 16 is a diagram describing label correction. As illustrated in FIG. 16, the label correction unit 65 acquires the coordinates of each polygon related to the regions of interest (C2' and C3') from the extraction processing unit 50, and maps the coordinates to the clustered segmentation result (image data). The label correction unit 65 specifies the cluster L2 to which the region of interest C2' belongs and the cluster L3 to which the region of interest C3' belongs.

After that, the label correction unit 65 generates a region L2' obtained by expanding the region of the cluster L2 such that the region of interest C2' is included. The label correction unit 65 corrects (changes) the label "aisle" set in the region L2' to the label "region of interest".

Similarly, the label correction unit 65 generates a region L3' obtained by expanding the region of the cluster L3 such that the region of interest C3' is included. The label correction unit 65 corrects the label "aisle" set in the region L3' to the label "region of interest".

When a region of interest is larger than the region of a cluster, the label correction unit 65 corrects (changes) the label "aisle" of the region of interest to the label "region of interest". The label correction unit 65 outputs a label-set segmentation result including a correction result to the area setting unit 70.

Returning to FIG. 5, the area setting unit 70 is a processing unit that sets, based on the face direction or the body direction, a region that is adjacent to the label "region of interest" among a plurality of regions constituting the store 1 and in which an object related to a person is stored. For example, the area setting unit 70 specifies, for the image data, a store shelf area in which an item to be the target of a picking motion is placed. For example, the area setting unit 70 changes the label already set by the segmentation result to the label "store shelf" for areas adjacent to the region L2' and the region L3'.

Figure 17:
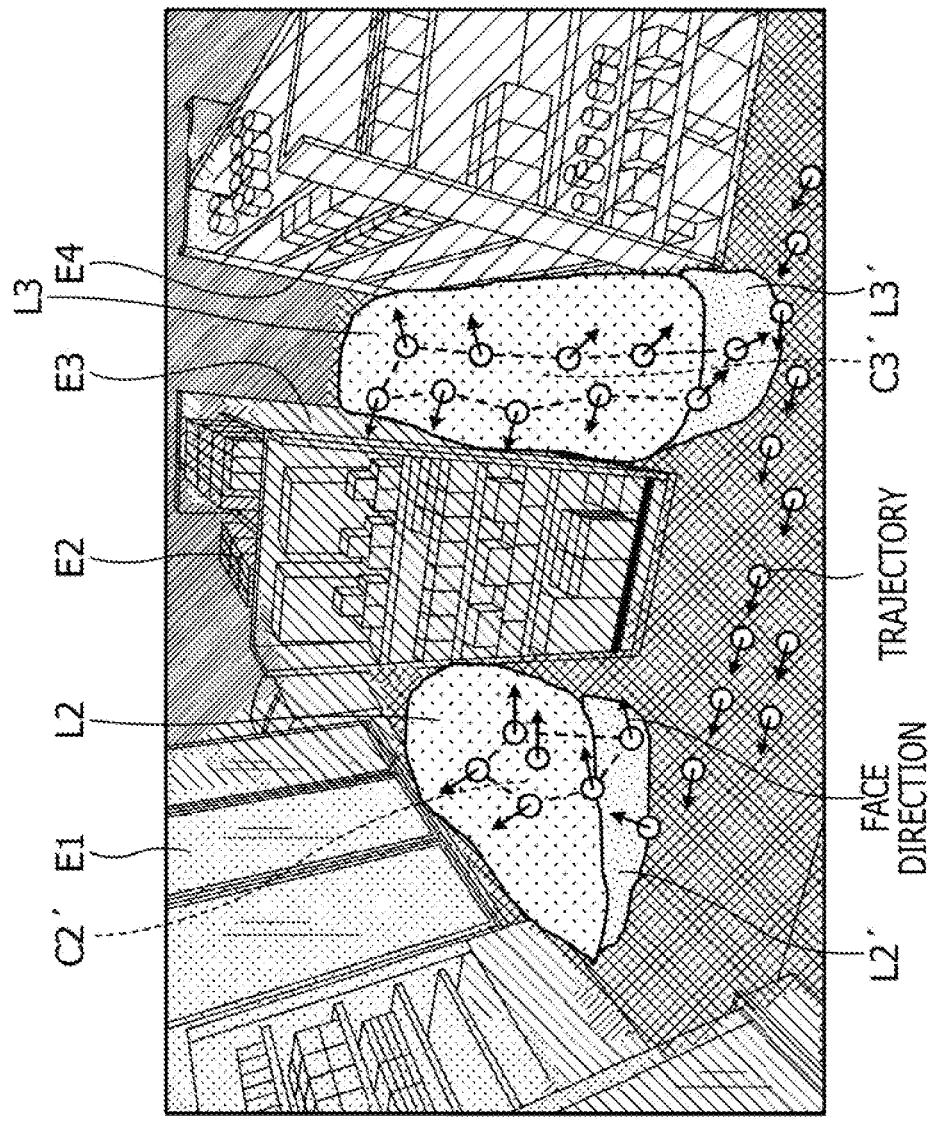
FIG. 17 is a diagram describing setting of a store shelf area.

FIG. 17 is a diagram describing setting of a store shelf area. As illustrated in FIG. 17, the area setting unit 70 acquires, from the extraction processing unit 50, the movement trajectories and the face directions belonging to each region and plots the movement trajectories and the face directions, for each of the region L2' and the region L3' for which the label "region of interest" is set.

The area setting unit 70 specifies a direction in which the number of vectors of the face direction is equal to or larger than a threshold, and specifies a region E1 and a region E2 as regions in contact with the region L2' or regions adjacent to the region L2' among regions existing in the direction. As a result, the area setting unit 70 sets the label of the region E1 and the region E2 as "store shelf area" in the segmentation result.

Similarly, the area setting unit 70 specifies a direction in which the number of vectors of the face direction is equal to or larger than a threshold, and specifies a region E3 and a region E4 as regions in contact with the region L3' or regions adjacent to the region L3' among regions existing in the direction. As a result, the area setting unit 70 sets the label of the region E3 and the region E4 as "store shelf area" in the segmentation result.

The area setting unit 70 stores, in the setting result DB 19, information such as the coordinates of the regions E1, E2, E3, and E4 and the image data in which the regions E1 to E4 are set. The area setting unit 70 may set regions of "store shelf area" not in a segmentation result but in image data that is the source of the segmentation result.

Flow of Extraction Processing

Figure 18:
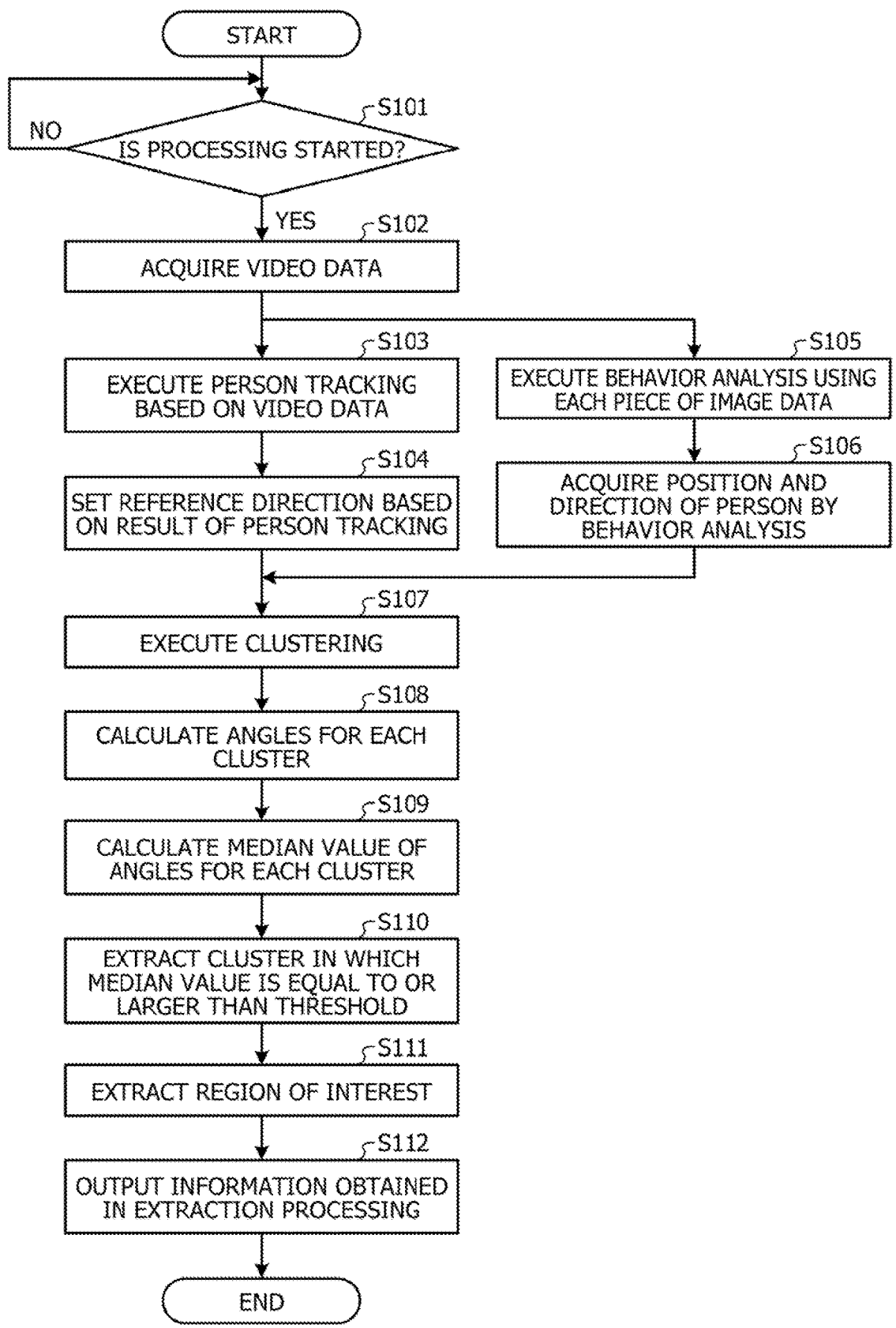
FIG. 18 is a flowchart illustrating a flow of extraction processing according to Embodiment 1.

FIG. 18 is a flowchart illustrating a flow of extraction processing according to Embodiment 1. As illustrated in FIG. 18, when start of processing is instructed (S101: Yes), the extraction processing unit 50 acquires video data from the video data DB 16 (S102).

Subsequently, the extraction processing unit 50 executes person tracking based on the video data (S103), and sets a reference direction based on a person tracking result (S104). For example, the extraction processing unit 50 tracks the same person in the video data and extracts a movement route, and sets a reference line by using the movement route on which a user walks.

The extraction processing unit 50 executes behavior analysis using each piece of image data constituting the video data (S105), and acquires a position and a direction of a person based on a result of the behavior analysis (S106). For example, the extraction processing unit 50 uses the second machine learning model 15 and specifies the face direction, body direction, and ankle position of each person in the video data and the transition thereof.

After that, the extraction processing unit 50 extracts a movement trajectory of each person, and generates a plurality of clusters by clustering based on the distance between each reference line and the movement trajectory of each person (S107). For example, the extraction processing unit 50 performs clustering of which reference line each movement trajectory is close to.

Subsequently, the extraction processing unit 50 calculates an angle for each cluster (S108). For example, the extraction processing unit 50 calculates an angle between the body direction corresponding to each movement trajectory and the reference line of a cluster to which each movement trajectory belongs.

The extraction processing unit 50 calculates, for each cluster, a median value of the angles of the movement trajectories belonging to the cluster (S109), and extracts a cluster in which the median value is equal to or larger than a threshold (S110). Subsequently, the extraction processing unit 50 generates a polygonal region so as to enclose (include) all the movement trajectories belonging to the extracted cluster, and extracts the region as a region of interest (S111).

After that, the extraction processing unit 50 outputs information obtained in the extraction processing, such as information on the region of interest, the coordinates of the polygon, and the behavior recognition result, to the storage unit 12 and the correction processing unit 60 (S112).

Flow of Correction Processing

Figure 19:
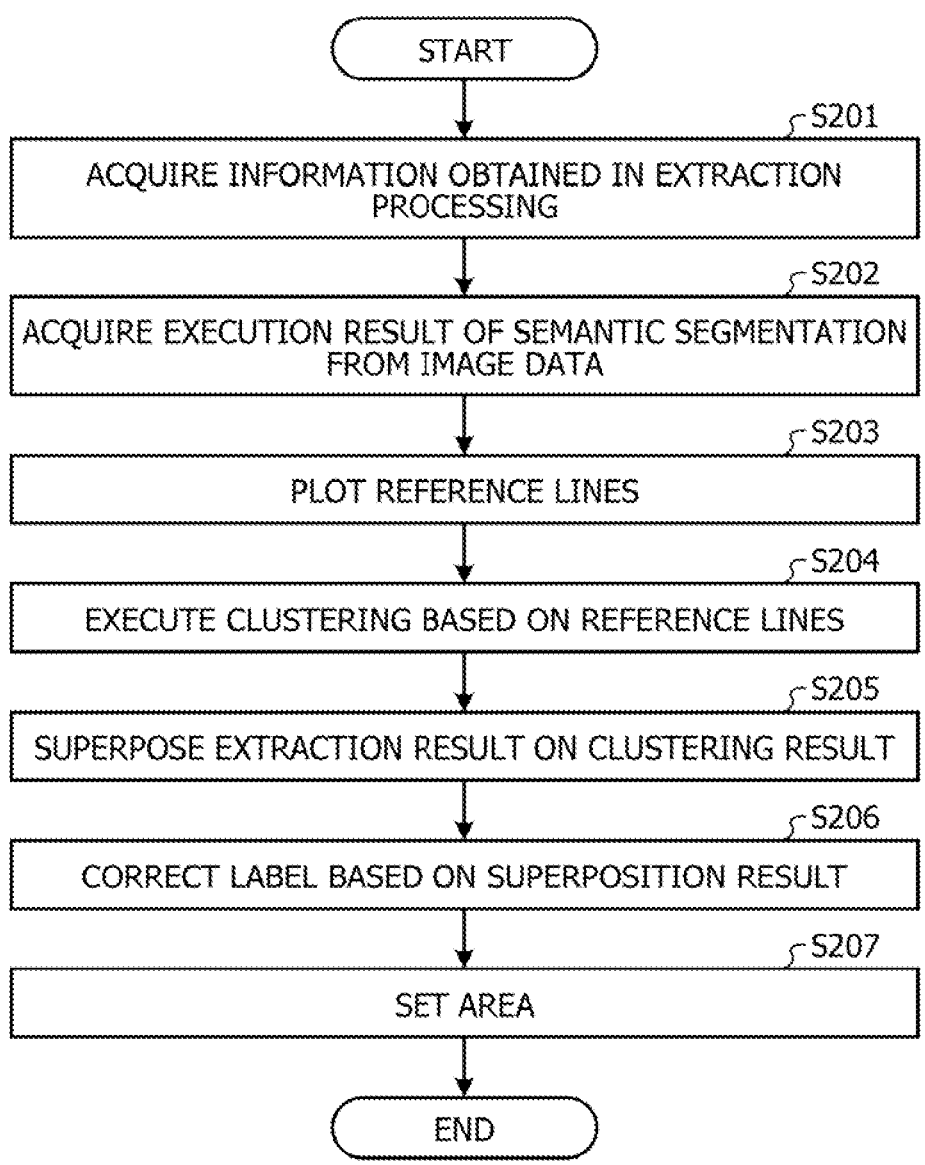
FIG. 19 is a flowchart illustrating a flow of correction processing according to Embodiment 1.

FIG. 19 is a flowchart illustrating a flow of correction processing according to Embodiment 1. As illustrated in FIG. 19, the correction processing unit 60 acquires information obtained in the extraction processing of FIG. 18 (S201), inputs the image data to the first machine learning model 14, and acquires an execution result of semantic segmentation on the image data (S202).

Subsequently, the correction processing unit 60 plots reference lines on the execution result of semantic segmentation (S203), and executes clustering based on the reference lines (S204). For example, the correction processing unit 60 performs clustering of which reference line each pixel of an aisle is close to.

The correction processing unit 60 superposes an extraction result on a clustering result (S205). For example, the correction processing unit 60 maps the polygon of the region of interest generated in the processing of FIG. 18 to the clustering result.

After that, the correction processing unit 60 executes label correction based on a superposition result (S206). For example, the correction processing unit 60 expands the region of a cluster so as to maximally include the region of interest, and corrects the label "aisle" of the area to which the expanded region belongs to the label "region of interest". The area setting unit 70 sets a store shelf area adjacent to the region of interest based on the face direction or the body direction (S207).

Effects

As described above, the information processing apparatus 10 executes semantic segmentation of performing region division of image data, re-extracts an aisle region from a segmentation result and a motion analysis result, extracts variation between the face direction and the body direction from the motion analysis result, and extracts a region of interest by clustering from the aisle region and variation information. The information processing apparatus 10 performs clustering on the aisle region of the segmentation result, corrects the region such that the clustering result and the extracted region of interest is the maximum, and labels the corrected region as a region of interest.

As a result, the information processing apparatus 10 may suppress the occurrence of a problem that an excess or deficiency occurs in the extracted region when a region of interest is to be extracted, and may automatically provide a region of interest without excess or deficiency. Accordingly, the information processing apparatus 10 may accurately set a region of interest to be the target of behavior analysis.

Embodiment 2

Although an example in which reference lines are extracted and a region of interest (coordinates of a polygon) is generated by clustering using the reference lines has been described in Embodiment 1, this is not the only way of extracting a region of interest. For example, the information processing apparatus 10 may extract a region of interest by using the fact that the face and body directions are the same during movement and variation occurs between the face and body directions during the behavior of selecting and picking up an item.

Accordingly, in Embodiment 2, an example in which a region of interest is extracted using variation between the face and body directions will be described as alternative processing executed by the extraction processing unit 50. Since the processing of the correction processing unit 60 is the same as that in Embodiment 1, detailed description thereof will be omitted.

First, the extraction processing unit 50 inputs each piece of image data (frame) included in video data imaged by the camera 2 to the second machine learning model 15, and recognizes a motion of a person appearing in each piece of image data. For example, the extraction processing unit 50 specifies the two dimensional skeleton coordinates of a person, the ankle position, face direction, and body direction of a person, and the like by the method described with reference to FIG. 8.

For example, the extraction processing unit 50 may specify the transition of the ankle position, the transition of the face direction, and the transition of the body direction of a person appearing in video data by inputting each piece of image data included in each piece of video data acquired at predetermined time intervals (for example, 100 frames) to the second machine learning model 15, and measuring the ankle position, face direction, and body direction of the person appearing in each piece of image data.

Next, the extraction processing unit 50 extracts variation between the body direction and face direction of a person by using the two dimensional skeleton coordinates of the person. For example, the extraction processing unit 50 acquires, from the motion analysis unit 52, the face direction and the body direction for each piece of image data included in the video data (for example, 100 frames). Subsequently, the extraction processing unit 50 calculates, as variation, an angle formed by the face direction and body direction of a person in each piece of image data.

Next, the extraction processing unit 50 generates a movement trajectory of each person appearing in the video data. For example, the extraction processing unit 50 generates a movement trajectory of a person by plotting the ankle position of the person on a result of executing semantic segmentation on image data in the video data.

Figure 20:
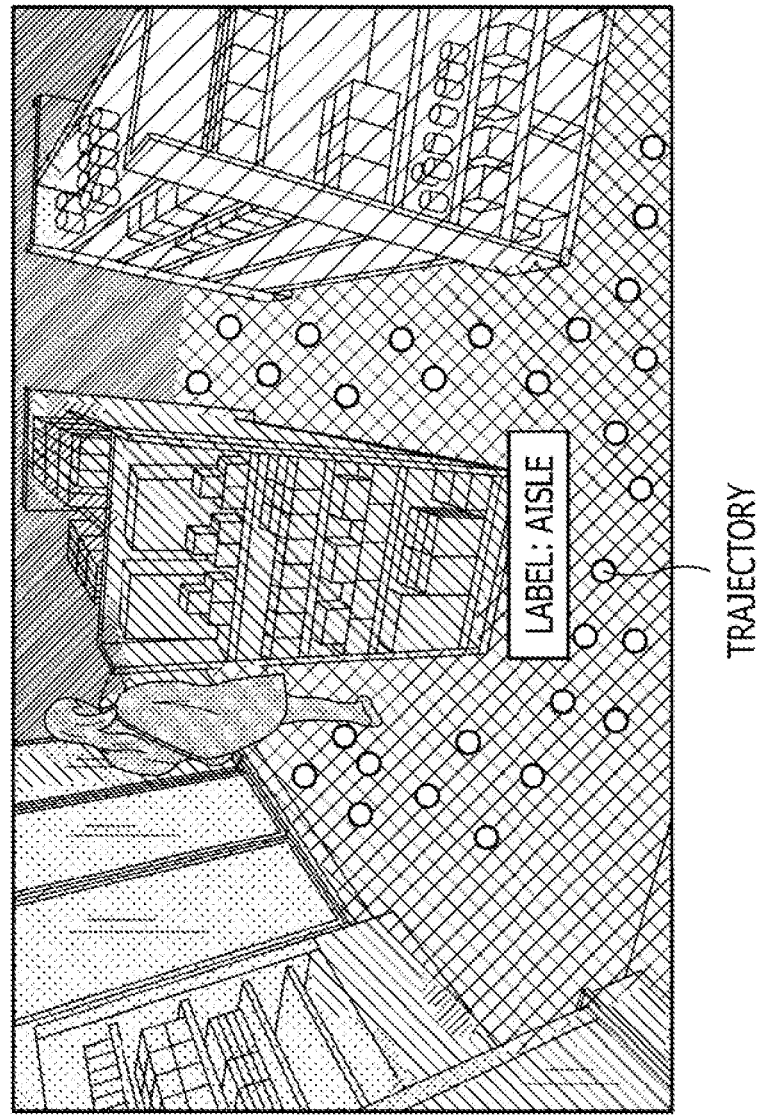
FIG. 20 is a diagram describing generation of a movement trajectory of a user according to Embodiment 2.

FIG. 20 is a diagram describing generation of a movement trajectory of a user according to Embodiment 2. As illustrated in FIG. 20, the extraction processing unit 50 inputs image data (for example, the last image data) in video data to the first machine learning model 14. A region (area) is identified by the first machine learning model 14, and the extraction processing unit 50 acquires a segmentation result in which a label is set for each area.

After that, the extraction processing unit 50 specifies an aisle region in which the label "aisle" is set from the labels included in the segmentation result. Subsequently, for the aisle region, the extraction processing unit 50 plots, as a trajectory, the ankle position of each person specified from each piece of image data in the video data. As described above, the extraction processing unit 50 may generate, for the video data, a movement trajectory along which a person who appears in the video data moves in the aisle region.

Figure 21:
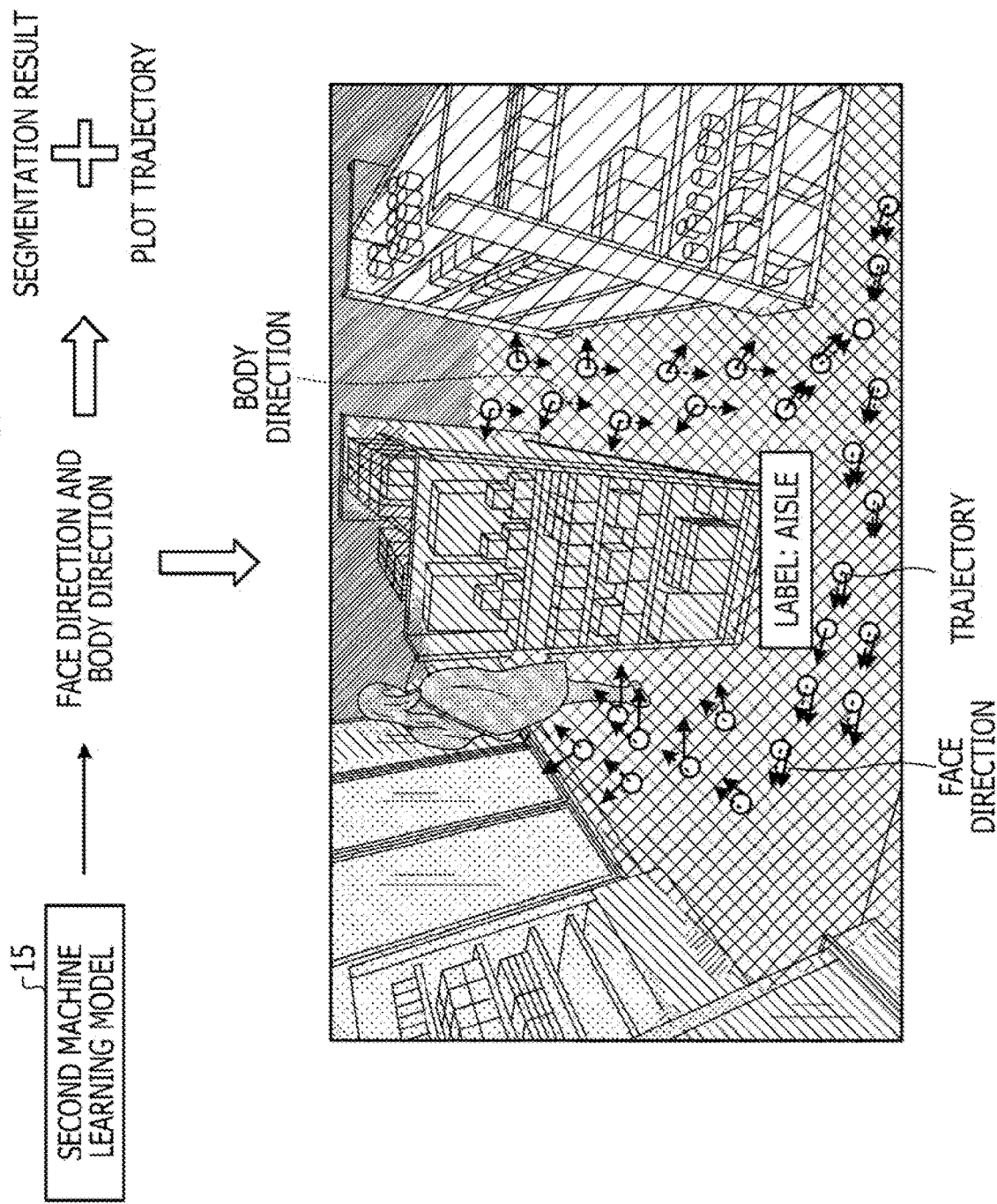
FIG. 21 is a diagram describing plotting of the face direction and the body direction according to Embodiment 2.
Figure 22:
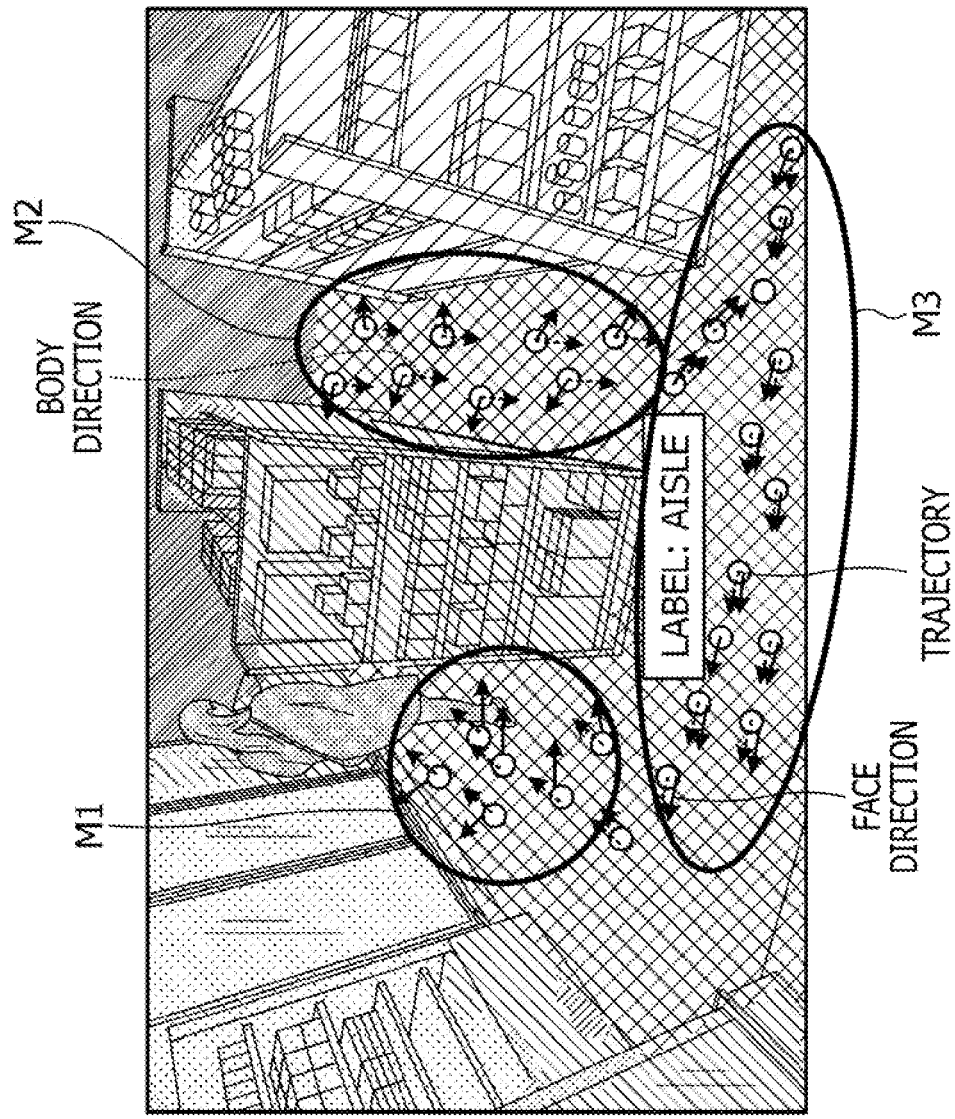
FIG. 22 is a diagram describing extraction of a region of interest according to Embodiment 2.

Next, the extraction processing unit 50 extracts, as a region of interest, a region including movement trajectories of which the angle formed by the face direction and body direction of a person is equal to or larger than a threshold among the generated movement trajectories. FIG. 21 is a diagram describing plotting of the face direction and the body direction according to Embodiment 2, and FIG. 22 is a diagram describing extraction of a region of interest according to Embodiment 2.

As illustrated in FIG. 21, the extraction processing unit 50 plots the specified face direction and body direction of a person on the generated movement trajectory. Subsequently, the extraction processing unit 50 specifies an angle between the face direction and body direction of a person for each trajectory based on the calculated angle (variation). After that, as illustrated in FIG. 22, the extraction processing unit 50 executes clustering for the point cloud of movement trajectories based on the variation between the face direction and the body direction. The extraction processing unit 50 extracts, as regions of interest, regions M1 and M2 in which the angle is equal to or larger than a threshold and clustering has been executed as having large variation, and extracts, as an aisle region, a region M3 in which the angle is less than the threshold and clustering has been executed as having small variation.

Figure 23:
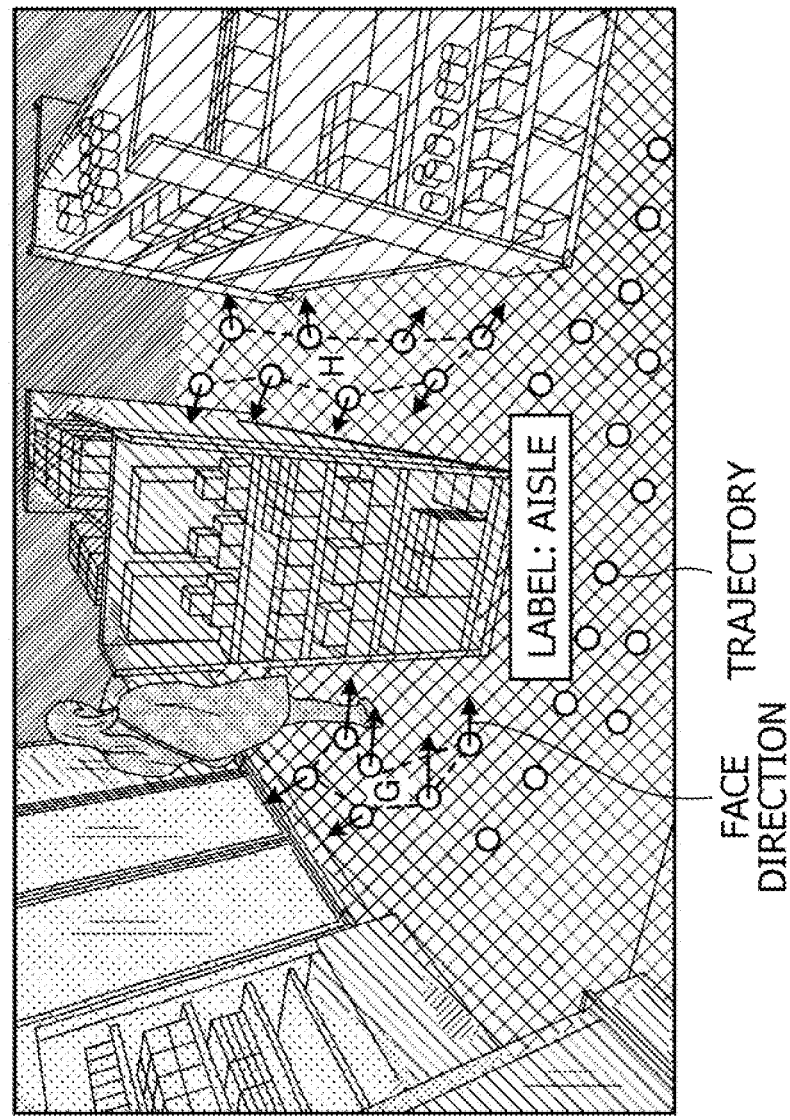
FIG. 23 is a diagram describing generation of the coordinates of a region of interest.

Finally, the extraction processing unit 50 generates the coordinates of a region of interest. FIG. 23 is a diagram describing generation of the coordinates of a region of interest. As illustrated in FIG. 23, the extraction processing unit 50 generates a polygon G surrounding the trajectories (point cloud) belonging to the cluster M1 extracted as a region of interest, and extracts the coordinates of the polygon G. Similarly, the extraction processing unit 50 generates a polygon H surrounding the trajectories belonging to the cluster M2 extracted as a region of interest, and extracts the coordinates of the polygon H.

As described above, the extraction processing unit 50 may narrow down a region of interest, which is a region to be the target of behavior analysis of a person in video data and is a region to be the target of detecting a picking motion for an item. The correction processing unit 60 executes the processing of FIG. 19 by using information on a region of interest generated by the method described in Embodiment 2 (for example, the coordinates of a polygon). For example, without being limited to clustering, the extraction processing unit 50 may use methods such as extracting, as a region of interest, each region that maximally includes trajectories of which the angle is equal to or larger than a threshold.

Flow of Processing

Figure 24:
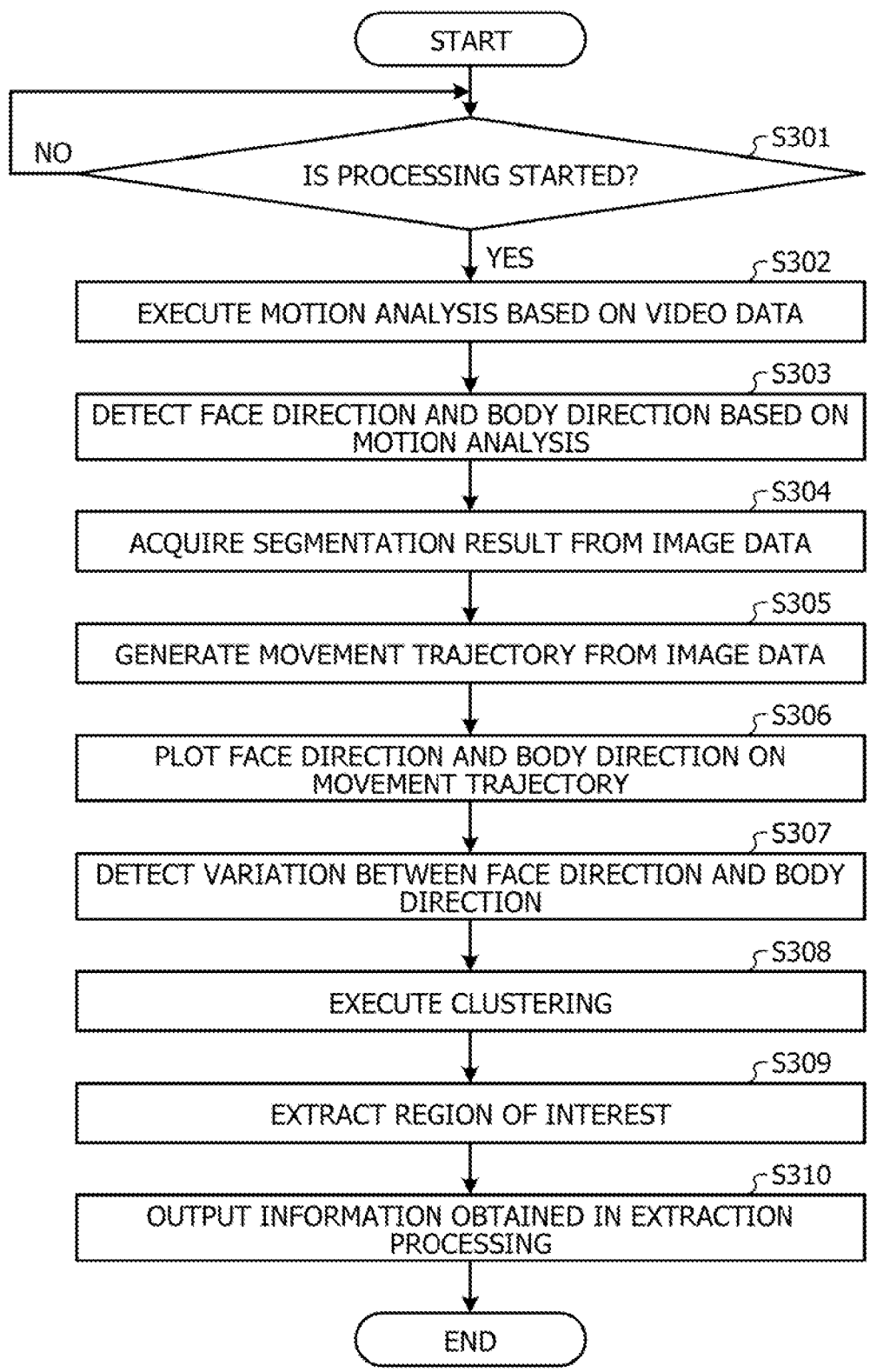
FIG. 24 is a flowchart illustrating a flow of extraction processing according to Embodiment 2.

FIG. 24 is a flowchart illustrating a flow of extraction processing according to Embodiment 2. As illustrated in FIG. 24, when start of processing is instructed (S301: Yes), the extraction processing unit 50 executes motion analysis based on video data (S302). The extraction processing unit 50 detects the face direction and the like of a person based on the motion analysis (S303). For example, the extraction processing unit 50 inputs each piece of image data included in the video data to the second machine learning model 15, specifies two dimensional skeleton information of a person included in each piece of image data or transition of the two dimensional skeleton information, and detects the ankle position, face direction, and body direction of each person.

Subsequently, the extraction processing unit 50 inputs image data included in the video data to the first machine learning model 14, and acquires a segmentation result that is an execution result of semantic segmentation (S304).

The extraction processing unit 50 generates a movement trajectory of a person from each piece of image data included in the video data (S305). For example, the extraction processing unit 50 generates a movement trajectory of each person by plotting the ankle position specified for a person in each piece of image data on the segmentation result.

After that, the extraction processing unit 50 plots the face direction and the body direction on each movement trajectory in the segmentation result on which the movement trajectories have been plotted (S306). The extraction processing unit 50 detects variation between the face direction and the body direction (S307). For example, the extraction processing unit 50 acquires, for each movement trajectory, an angle formed by the vectors of the face direction and the body direction as variation.

Subsequently, the extraction processing unit 50 executes clustering based on the variation between the face direction and the body direction (S308), and extracts a region of interest based on a clustering result (S309). For example, the region-of-interest extraction unit 26 extracts, as a region of interest, a cluster of trajectories of which the angle is equal to or larger than a threshold. After that, the extraction processing unit 50 outputs information obtained in the extraction processing, such as information on the region of interest, the coordinates of the polygon, and the behavior recognition result, to the storage unit 12 and the correction processing unit 60 (S310).

Effects

By using the information processing apparatus 10, since a region of interest does not have to be manually set, it is possible to reduce human errors and to achieve accurate and high-speed setting of a region of interest for a large amount of image data as compared with manual setting. Since the information processing apparatus 10 may extract, as a region of interest, a region in which a motion of moving a face when a person expresses interest has been performed, unlike the reference technique of FIG. 4, the information processing apparatus may set a region of interest without excess or deficiency.

Since the information processing apparatus 10 may specify a region adjacent to the region of interest without excess or deficiency as a store shelf, unlike the reference technique, the information processing apparatus may detect not only a picking motion in a stopped state but also a picking motion of picking up an item while moving slowly. As a result, the information processing apparatus 10 may improve the accuracy of detecting a picking motion, and may improve the accuracy of behavior analysis and the like.

Embodiment 3

While the embodiments of the present disclosure have been described, the present disclosure may be implemented in various different forms other than the above-described embodiments.

Numerical Values and the Like

The numerical value example, the number of cameras, the name of labels, the number of trajectories, and the like used in the above embodiments are merely examples and may be arbitrarily changed. The flow of processing described in each flowchart may also be changed as appropriate within the scope without contradiction. Although description has been given with a store as an example in the above embodiments, this is not the only case. For example, the present disclosure may be applied to a warehouse, a factory, a classroom, a train cabin, an airplane cabin, and the like. In these cases, instead of the region of a store shelf described as an example of a region in which an object related to a person is stored, a region where an object is placed or a region where a baggage is stowed is the target of detection and setting.

Although an example in which the ankle position of a person is used has been described in the above embodiments, this is not the only case. For example, the foot position, the shoes position, or the like may be used. Although an example in which an area existing in the direction of the face direction is specified as a store shelf area has been described in the above embodiments, an area existing in the direction of the body direction may be specified as a store shelf area. A neural network or the like may be used for each machine learning model.

System

The processing procedures, control procedures, specific names, and information including various types of data and parameters described and illustrated in the above specification and drawings may be arbitrarily changed unless otherwise specified.

The function of each component of each device illustrated in the drawings is conceptual, and the components do not have to be configured physically as illustrated in the drawings. For example, the specific form of distribution or integration of each device is not limited to that illustrated in the drawings. For example, the entirety or a part thereof may be configured by being functionally or physically distributed or integrated in an arbitrary unit according to various types of loads, usage states, or the like.

All or arbitrary part of the processing functions performed in each device may be realized by a central processing unit (CPU) and a program analyzed and executed by the CPU or may be realized as hardware using wired logic.

Hardware

Figure 25:
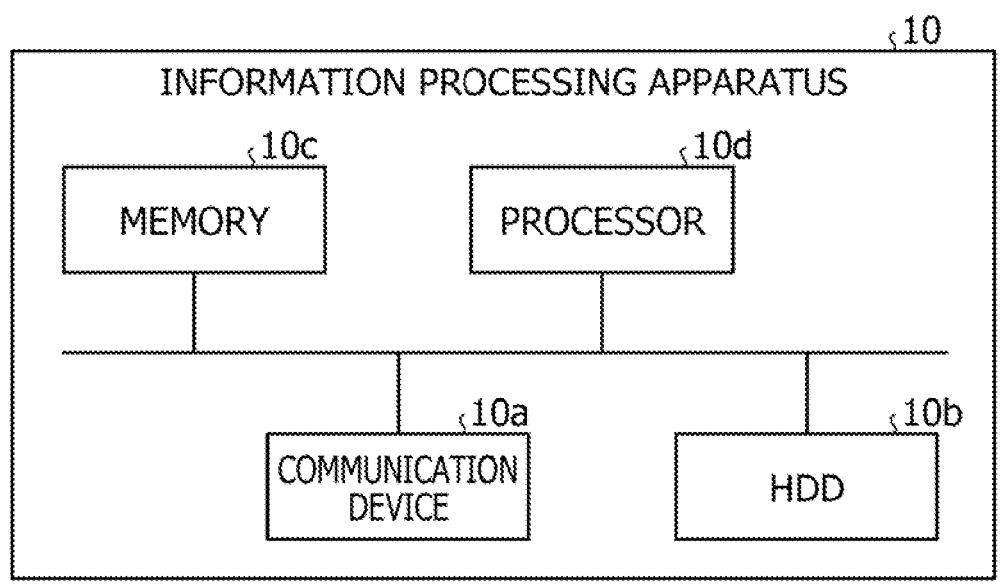
FIG. 25 is a diagram describing an example of a hardware configuration.

FIG. 25 is a diagram describing an example of a hardware configuration. As illustrated in FIG. 25, the information processing apparatus 10 includes a communication device 10a, a hard disk drive (HDD) 10b, a memory 10c, and a processor 10d. The units illustrated in FIG. 25 are coupled to one another by a bus or the like.

The communication device 10a is a network interface card or the like, and communicates with other apparatuses. The HDD 10b stores a program that causes the functions illustrated in FIG. 5 to operate and a DB.

The processor 10d causes a process that executes each function described in FIG. 5 and the like to operate by reading from the HDD 10b or the like a program that executes processing similar to that performed by each processing unit illustrated in FIG. 5 and loading the read program to the memory 10c. For example, this process executes the functions similar to the function of each processing unit included in the information processing apparatus 10. For example, the processor 10d reads from the HDD 10b or the like a program that has the function similar to those of the pre-learning unit 30, the acquisition unit 40, the extraction processing unit 50, the correction processing unit 60, the area setting unit 70, and the like. The processor 10d executes a process that executes processing similar to that performed by the pre-learning unit 30, the acquisition unit 40, the extraction processing unit 50, the correction processing unit 60, the area setting unit 70, and the like.

As described above, the information processing apparatus 10 operates as an information processing apparatus that executes an information processing method by reading and executing a program. The information processing apparatus 10 may also realize the functions similar to those of the above-described embodiment by reading the above program from a recording medium with a medium reading device and executing the above read program. The program described in this other embodiment is not limited to being executed by the information processing apparatus 10. For example, the above embodiments may be similarly applied to a case where another computer or server executes the program or a case where such computer and server execute the program in cooperation with each other.

The program may be distributed over a network such as the Internet. The program may be recorded in a computer-readable recording medium such as a hard disk, a flexible disk (FD), a compact disc read-only memory (CD-ROM), a magneto-optical (MO) disk, or a Digital Versatile Disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a label change program for causing a computer to execute a process comprising:
   acquiring image data that includes a plurality of areas;
   setting a label for each of the plurality of areas by inputting the image data to a first machine learning model;
   specifying a behavior performed by a person located in a first area among the plurality of areas for an object located in a second area; and
   changing a label set for the second area based on a specified behavior of the person,
   wherein a process is executed including
   setting each reference line that indicates a movement route of a person in an aisle region of the image data by using tracking information obtained by tracking the same person based on video data that includes the image data obtained by imaging an inside of a room,
   specifying a position of each person that appears in the video data based on skeleton information of the each person,
   specifying a movement trajectory of the each person in the video data by using a position of the each person,
   generating a plurality of clusters by clustering based on a distance between the each reference line and a movement trajectory of the each person in the image data,
   extracting a region of interest that includes a cluster for which an evaluation value based on an angle formed by each movement trajectory that belongs to the cluster and the reference line is equal to or larger than a threshold, for each of the plurality of clusters, and
   changing the label set for each of the plurality of areas set by the first machine learning model based on a region of interest that includes the cluster.

2. The non-transitory computer-readable recording medium according to claim 1,
   wherein the specifying of a behavior executes a process of generating skeleton information of the person located in the first area by inputting the acquired image data to a second machine learning model, and
   wherein the changing executes a process including specifying a behavior of the person for an object in the second area based on the generated skeleton information, and
   changing a label set for the second area by using the specified behavior.

3. The non-transitory computer-readable recording medium according to claim 1, wherein the changing executes a process including
   setting the each reference line in an aisle region identified by the first machine learning model,
   generating a plurality of clusters by clustering based on a distance between each pixel that belongs to the aisle region and the each reference line,
   specifying a cluster of interest that corresponds to the region of interest among the plurality of clusters, correcting a region of the cluster of interest to a region that includes the corresponding region of interest, and
   changing a label already set for the corrected region by the first machine learning model to a label that corresponds to the region of interest.

4. The non-transitory computer-readable recording medium according to claim 1, wherein a process is executed including
   specifying, from each piece of image data in video data that includes the image data, a position of each person that appears in the video data,
   specifying a region of interest that is a target of behavior analysis of the person in the first area based on an angle formed by a face direction of the person and a body direction of the person at a position of the each person, and
   changing a label of each of the plurality of areas set by the first machine learning model based on the region of interest.

5. The non-transitory computer-readable recording medium according to claim 4, wherein the changing executes a process including
   setting each reference line that indicates a movement route of a person in an aisle region identified by the first machine learning model,
   generating a plurality of clusters by clustering based on a distance between each pixel that belongs to the aisle region and the each reference line,
   specifying a cluster of interest that corresponds to the region of interest among the plurality of clusters,
   correcting a region of the cluster of interest to a region that includes the corresponding region of interest, and
   changing a label set for the corrected region by the first machine learning model to a label that corresponds to the region of interest.

6. A label change method comprising:
   acquiring image data that includes a plurality of areas;
   setting a label for each of the plurality of areas by inputting the image data to a first machine learning model;

specifying a behavior performed by a person located in a first area among the plurality of areas for an object located in a second area; and changing a label set for the second area based on a specified behavior of the person, wherein the method includes setting each reference line that indicates a movement route of a person in an aisle region of the image data by using tracking information obtained by tracking the same person based on video data that includes the image data obtained by imaging an inside of a room, specifying a position of each person that appears in the video data based on skeleton information of the each person, specifying a movement trajectory of the each person in the video data by using a position of the each person, generating a plurality of clusters by clustering based on a distance between the each reference line and a movement trajectory of the each person in the image data, extracting a region of interest that includes a cluster for which an evaluation value based on an angle formed by each movement trajectory that belongs to the cluster and the reference line is equal to or larger than a threshold, for each of the plurality of clusters, and changing the label set for each of the plurality of areas set by the first machine learning model based on a region of interest that includes the cluster.

7. An information processing apparatus comprising:

a memory; and a processor coupled to the memory and configured to:

acquire image data that includes a plurality of areas;

set a label for each of the plurality of areas by inputting the image data to a first machine learning model;

specify a behavior performed by a person located in a first area among the plurality of areas for an object located in a second area; and change a label set for the second area based on a specified behavior of the person, wherein the processor sets each reference line that indicates a movement route of a person in an aisle region of the image data by using tracking information obtained by tracking the same person based on video data that includes the image data obtained by imaging an inside of a room, specifies a position of each person that appears in the video data based on skeleton information of the each person, specifies a movement trajectory of the each person in the video data by using a position of the each person, generates a plurality of clusters by clustering based on a distance between the each reference line and a movement trajectory of the each person in the image data, extracts a region of interest that includes a cluster for which an evaluation value based on an angle formed by each movement trajectory that belongs to the cluster and the reference line is equal to or larger than a threshold, for each of the plurality of clusters, and changes the label set for each of the plurality of areas set by the first machine learning model based on a region of interest that includes the cluster.

* * * * *